(12) United States Patent
Gniadek

(10) Patent No.: US 12,399,329 B2
(45) Date of Patent: Aug. 26, 2025

(54) ADAPTER SYSTEM FOR MULTI-FIBER MECHANICAL TRANSFER TYPE FERRULE

(71) Applicant: SENKO Advanced Components, Inc., Hudson, MA (US)

(72) Inventor: Jeffrey Gniadek, Oxford, ME (US)

(73) Assignee: SENKO Advanced Components, Inc., Hudson, MA (US)

( * ) Notice: Subject to any disclaimer, the term of this patent is extended or adjusted under 35 U.S.C. 154(b) by 40 days.

(21) Appl. No.: 18/054,955

(22) Filed: Nov. 14, 2022

(65) Prior Publication Data

US 2023/0071065 A1 Mar. 9, 2023

Related U.S. Application Data

(63) Continuation of application No. 17/115,975, filed on Dec. 9, 2020, now Pat. No. 11,531,169, which is a continuation of application No. 16/123,381, filed on Sep. 6, 2018, now Pat. No. 10,866,371, which is a continuation of application No. 16/016,577, filed on Jun. 23, 2018, now Pat. No. 10,107,972, which is a continuation of application No. 15/670,161, filed on Aug. 7, 2017, now Pat. No. 10,078,187, which is a continuation of application No. 15/195,405, filed on Jun. 28, 2016, now Pat. No. 9,726,830.

(51) Int. Cl.
*G02B 6/38* (2006.01)

(52) U.S. Cl.
CPC ......... *G02B 6/3879* (2013.01); *G02B 6/3821* (2013.01); *G02B 6/3825* (2013.01); *G02B 6/3885* (2013.01); *G02B 6/3893* (2013.01)

(58) Field of Classification Search
CPC .. G02B 6/3879; G02B 6/3821; G02B 6/3825; G02B 6/3885; G02B 6/3893
USPC .......................................................... 385/59
See application file for complete search history.

(56) References Cited

U.S. PATENT DOCUMENTS

| | | | |
|---|---|---|---|
| 3,733,576 A | 5/1973 | Cooper | |
| 4,645,295 A | 2/1987 | Pronovost | |

(Continued)

FOREIGN PATENT DOCUMENTS

| | | |
|---|---|---|
| CN | 201740886 U | 2/2011 |
| JP | 2573482 | 3/1998 |

(Continued)

OTHER PUBLICATIONS

International Searching Authority, International Search Report and Written Opinion, dated Mar. 24, 2017, Application No. PCT/US17/19901, 12 pages.

(Continued)

*Primary Examiner* — Jerry M Blevins

(57) ABSTRACT

Devices and methods for connecting optical fibers are provided. In some embodiments, connectors and adaptors for two-fiber mechanical transfer type ferrules are disclosed. In some embodiments, MT connectors, such as simplex, duplex, and quad micro-MT adaptors are disclosed. In some embodiments, MT adaptors, such as simplex, duplex, and quad adaptors are disclosed. In some embodiments, optical fiber cables that modularly coupled with at least one optical fiber connector, adaptor, and other optical fiber cable the cable is configured to provide a remote release from an adaptor receptacle.

6 Claims, 25 Drawing Sheets

(56) References Cited

U.S. PATENT DOCUMENTS

| | | |
|---|---|---|
| 5,181,267 A | 1/1993 | Gerace et al. |
| 5,222,168 A | 6/1993 | Saito et al. |
| 5,390,272 A | 2/1995 | Repta et al. |
| 5,528,712 A | 6/1996 | Belenkiy et al. |
| 5,615,293 A | 3/1997 | Sayegh |
| 5,673,346 A | 9/1997 | Iwano et al. |
| 5,719,977 A | 2/1998 | Lampert et al. |
| 5,915,058 A | 6/1999 | Clairardin et al. |
| 6,146,023 A | 11/2000 | Weigel |
| 6,149,313 A | 11/2000 | Giebel et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,305,961 B1 | 10/2001 | Szilagyi et al. |
| 6,331,079 B1 | 12/2001 | Grois et al. |
| 6,357,931 B1 | 3/2002 | Shirakawa et al. |
| 6,371,659 B1 | 4/2002 | Weigel |
| 6,386,768 B1 | 5/2002 | Yoon et al. |
| 6,419,399 B1 | 7/2002 | Loder et al. |
| 6,450,695 B1 | 9/2002 | Matsumoto |
| 6,511,230 B1 | 1/2003 | Connelly et al. |
| 6,568,861 B2 | 5/2003 | Benner et al. |
| 6,575,640 B2 | 6/2003 | Connelly et al. |
| 6,715,928 B1 | 4/2004 | Matasek et al. |
| 6,764,222 B1 | 7/2004 | Szilagyi et al. |
| 6,796,715 B2 | 9/2004 | Chiu et al. |
| 6,918,704 B2 | 7/2005 | Marrs et al. |
| 6,929,406 B2 | 8/2005 | Amorim |
| 7,001,081 B2 | 2/2006 | Cox et al. |
| 7,150,567 B1 | 12/2006 | Luther et al. |
| 7,204,644 B2 | 4/2007 | Barnes et al. |
| 7,284,912 B2 | 10/2007 | Suzuki et al. |
| 7,347,634 B2 | 3/2008 | Günther et al. |
| 7,500,790 B2 | 3/2009 | Erdman et al. |
| 7,628,545 B2 | 12/2009 | Cody et al. |
| 7,677,812 B2 | 3/2010 | Castagna et al. |
| 8,061,906 B2 | 11/2011 | Nehler et al. |
| 8,406,597 B2 | 3/2013 | Case |
| 8,465,317 B2 | 6/2013 | Gniadek et al. |
| 8,556,646 B2 | 10/2013 | Kappla et al. |
| 8,636,424 B2 | 1/2014 | Kuffel et al. |
| 8,641,293 B2 | 2/2014 | Lin et al. |
| 8,662,760 B2 | 3/2014 | Cline et al. |
| 8,764,308 B2 | 7/2014 | Irwin et al. |
| 8,834,038 B2 | 9/2014 | Limbert et al. |
| 8,858,089 B2 | 10/2014 | Bradley |
| 9,366,829 B2 | 6/2016 | Czosnowski et al. |
| 9,411,111 B2 | 8/2016 | Banal, Jr. et al. |
| 9,557,495 B2 | 1/2017 | Raven et al. |
| 9,568,689 B2 | 2/2017 | Nguyen et al. |
| 9,599,778 B2 | 3/2017 | Wong et al. |
| 9,625,658 B1 | 4/2017 | Lin |
| 9,684,130 B2 | 6/2017 | Veatch et al. |
| 10,156,683 B2 | 12/2018 | Manes et al. |
| 10,156,684 B2 | 12/2018 | Nguyen et al. |
| 10,191,230 B2 | 1/2019 | Wong et al. |
| 10,495,823 B2 | 12/2019 | Good et al. |
| 10,890,723 B2 | 1/2021 | Nguyen et al. |
| 11,061,190 B2 | 7/2021 | Takano et al. |
| 11,181,701 B2 | 11/2021 | Wong et al. |
| 11,307,369 B2 | 4/2022 | Takano et al. |
| 11,333,836 B2 | 5/2022 | Wong et al. |
| 11,340,405 B2 | 5/2022 | Hendrick |
| 11,385,415 B2 | 7/2022 | Nguyen et al. |
| 11,415,760 B2 | 8/2022 | Takano et al. |
| 11,428,875 B2 | 8/2022 | Nguyen et al. |
| 11,525,965 B2 | 12/2022 | Childers et al. |
| 11,719,893 B2 | 8/2023 | Higley et al. |
| 11,733,466 B2 | 8/2023 | Higley et al. |
| 11,808,994 B1 | 11/2023 | Higley et al. |
| 11,846,813 B2 | 12/2023 | Childers et al. |
| 11,880,075 B1 | 1/2024 | Nguyen et al. |
| 11,906,794 B2 | 2/2024 | Higley et al. |
| 2003/0118293 A1 | 6/2003 | Canace et al. |
| 2003/0147230 A1 | 8/2003 | Hutermans et al. |
| 2004/0043654 A1 | 3/2004 | Lee et al. |
| 2004/0078961 A1 | 4/2004 | Chen et al. |
| 2004/0109646 A1 | 6/2004 | Anderson et al. |
| 2004/0247252 A1 | 12/2004 | Ehrenreich et al. |
| 2005/0111796 A1 | 5/2005 | Matasek et al. |
| 2005/0135752 A1 | 6/2005 | Kiani et al. |
| 2005/0135753 A1 | 6/2005 | Eigenmann et al. |
| 2005/0136722 A1 | 6/2005 | Cairns |
| 2005/0281509 A1 | 12/2005 | Cox et al. |
| 2008/0037938 A1 | 2/2008 | Kiani et al. |
| 2008/0144303 A1 | 6/2008 | Ice |
| 2008/0260333 A1 | 10/2008 | Roth |
| 2009/0176401 A1 | 7/2009 | Gu |
| 2010/0284656 A1 | 11/2010 | Morra et al. |
| 2011/0019962 A1 | 1/2011 | Childers et al. |
| 2011/0091159 A1 | 4/2011 | de Jong et al. |
| 2011/0299814 A1 | 12/2011 | Nakagawa |
| 2012/0057824 A1 | 3/2012 | Katoh |
| 2012/0057826 A1 | 3/2012 | Katoh |
| 2012/0082416 A1 | 4/2012 | Katoh |
| 2012/0099822 A1 | 4/2012 | Kuffel |
| 2012/0141072 A1 | 6/2012 | Katagiyama et al. |
| 2012/0177326 A1 | 7/2012 | Peng et al. |
| 2012/0213484 A1 | 8/2012 | Childers et al. |
| 2013/0019423 A1 | 1/2013 | Srutkowski |
| 2013/0094816 A1 | 4/2013 | Lin et al. |
| 2013/0122745 A1 | 5/2013 | Soubh et al. |
| 2013/0308916 A1 | 11/2013 | Buff |
| 2013/0322825 A1 | 12/2013 | Cooke et al. |
| 2013/0322826 A1 | 12/2013 | Henke et al. |
| 2014/0064690 A1* | 3/2014 | Nhep ................ G02B 6/3825 29/446 |
| 2014/0241689 A1 | 8/2014 | Bradley et al. |
| 2016/0041347 A1* | 2/2016 | Hodge ............... G02B 6/3885 385/84 |
| 2016/0094432 A1* | 3/2016 | Tingle .................. H04L 43/50 370/249 |
| 2016/0161680 A1 | 6/2016 | Nguyen et al. |
| 2016/0178850 A1 | 6/2016 | Nhep |
| 2016/0202431 A1 | 7/2016 | Hill et al. |
| 2016/0238796 A1 | 8/2016 | Nguyen et al. |
| 2016/0327756 A1 | 11/2016 | Raven et al. |
| 2017/0153879 A1 | 6/2017 | George et al. |
| 2017/0205587 A1 | 7/2017 | Chang et al. |
| 2017/0205588 A1 | 7/2017 | Lee |
| 2017/0227720 A1 | 8/2017 | Lin |
| 2017/0343740 A1 | 11/2017 | Nguyen |
| 2017/0351037 A1 | 12/2017 | Watanabe et al. |
| 2017/0363818 A1 | 12/2017 | Suzic |
| 2018/0106972 A1 | 4/2018 | Liu et al. |
| 2018/0217340 A1 | 8/2018 | Wong et al. |
| 2018/0224608 A1 | 8/2018 | Liu et al. |
| 2018/0252872 A1 | 9/2018 | Chen |
| 2019/0018201 A1 | 1/2019 | Takano et al. |
| 2019/0018209 A1 | 1/2019 | Takano et al. |
| 2019/0204513 A1 | 7/2019 | Davidson et al. |
| 2019/0243072 A1 | 8/2019 | Takano et al. |
| 2020/0285005 A1 | 9/2020 | Watanabe et al. |
| 2021/0099229 A1 | 4/2021 | Cox et al. |
| 2023/0213709 A1 | 7/2023 | Higley et al. |
| 2023/0393351 A1 | 12/2023 | Childers et al. |

FOREIGN PATENT DOCUMENTS

| | | |
|---|---|---|
| JP | 2001305391 A | 10/2001 |
| JP | 2004-354693 A | 12/2004 |
| JP | 3886610 B2 | 2/2007 |
| JP | 2012-53375 A | 3/2012 |
| WO | WO2012/174227 A2 | 12/2012 |
| WO | WO2013/100892 A1 | 7/2013 |
| WO | WO2014/057264 A2 | 4/2014 |
| WO | WO2015/027033 A1 | 2/2015 |
| WO | WO2017/127208 A1 | 7/2017 |
| WO | WO2018/042775 A1 | 3/2018 |
| WO | WO2019126337 A1 | 6/2019 |
| WO | WO2002/042818 A1 | 5/2022 |

OTHER PUBLICATIONS

(56) References Cited

OTHER PUBLICATIONS

Petition for Inter Partes Review of U.S. Pat. No. 11,340,413, *US Conec Ltd.*, Petitioner v. *Senko Advanced Components, Inc.*, Patent Owner, Before the Patent Trial and Appeal Board, Case IPR2024-00118, U.S. Pat. No. 11,340,413, dated Dec. 21, 2023, 131pgs.
Fibermart, "Fiber Optic Connector Tutorial," accessed on the internet at https://www.fiber-mart.com/news/fiber-optic-connector-tutorial-a-848.html, retrieved Dec. 21, 2023, 5pgs.
"Fiber Optic Rack Mount Enclosure, 3-Panel 1 RMS," accessed on the internet at https://www.computercablestore.com/fiber-optic-rack-mount-enclosure-3-panel-1-rms, retrieved Dec. 21, 2023, 4pgs.
Liteon, "19-Inch Rack," accessed on the internet at https://liteon-cips.com/products/racks/19-inch-rack/, retrieved Dec. 21, 2023, 5pgs.
Wagner et al., "SC-DC/SC-QC fiber optic connector," Opt. Eng., 37(12) 3129-3133, Dec. 1998.
Wenke, "Report On Fiber Optic Cables," Optical Communication ONT, Hochschule Bremen, City University of Applied Sciences, pp. 1-30, Dec. 18, 2015.
Kant, "Data center evolution A tutorial on state of the art, issues, and challenges," Computer Networks, 53:2939-2965, 2009.
Curran et al. "Basics of Fiber Optics," Amphenol Fiber Systems International, pp. 1-13, dated no later than Jan. 11, 2024.
Nishimura et al., "High-Density Multi-Fiber Connectors for Optical Interconnection," Furukawa Review, 34:13-16, Aug. 29, 2008.
Gurreri et al., " Multi-Fiber, MT Ferrule Endface Fiber Tip Displacement Model for Physical Contact Interconnects," 2006, pp. 1-12.
Declaration of James F. Brennan III, Ph.D. in Support of Petition for Inter Partes Review of U.S. Pat. No. 11,340,413, *US Conec Ltd.*, Petitioner v. *Senko Advanced Components, Inc.*, Patent Owner, Before the Patent Trial and Appeal Board, Case IPR2024-00118, U.S. Pat. No. 11,340,413, dated Dec. 21, 2023, 294pgs.
Petition for Inter Partes Review of U.S. Pat. No. 10,191,230, *US Conec Ltd.*, Petitioner v. *Senko Advanced Components, Inc.*, Patent Owner, Before the Patent Trial and Appeal Board, Case IPR2024-00120, U.S. Pat. No. 10,191,230 B2, dated Dec. 22, 2023, 177pgs.
"HDI-45 connector," accessed on the internet at https://en.wikipedia.org/wiki/HDI-45_connector, retrieved Dec. 22, 2023, 4pgs.
Google Data Centers gallery, accessed on the internet at https://www.google.com/about/datacenters/gallery/, retrieved Dec. 24, 2023, 83pgs.
Order Staying Case, *Senko Advanced Components, Inc.* vs. *US Conec Ltd.*, In the United States District Court for the District of Delaware, C.A. No. 23-083 (JPM), Jul. 6, 2023, 2pgs.
Kordz, "RJ45 CAT6 Field Termination Connector & & Strain Relief," Technical Data Sheet, kordz.com, 2019, 2pgs.
"Machine Design—An Integrated Approach," 3rd Edition, Pearson College Div, Jan. 1, 2005, 93pgs.
Declaration of William Singhose, PH.D. in Support of Petition for Inter Partes Review of U.S. Pat. No. 10,191,230, *US Conec Ltd.*, Petitioner v. *Senko Advanced Components, Inc.*, Patent Owner, Before the Patent Trial and Appeal Board, Case IPR2024-00120, U.S. Pat. No. 10,191,230 B2, dated Dec. 19, 2023, 342pgs.
Petition for Inter Partes Review of U.S. Pat. No. 11,385,415, *US Conec Ltd.*, Petitioner v. *Senko Advanced Components, Inc.*, Patent Owner, Before the Patent Trial and Appeal Board, Case IPR2024-00805, U.S. Pat. No. 11,385,415, dated Apr. 12, 2024, 207pgs.
Scheduling Order, *Senko Advanced Components, Inc.* vs. *US Conec Ltd.*, In the United States District Court for the District of Delaware, Case No. 1:23-cv-00083-JPM, Mar. 12, 2024, 9pgs.
Declaration of Edward Lurie, *Senko Advanced Components, Inc.*, Petitioner v. *US Conec Ltd.*, Patent Owner, Before the Patent Trial and Appeal Board, Case IPR2024-00805, U.S. Pat. No. 11,385,415, dated Apr. 11, 2024, 386pgs.
U.S. Appl. No. 61/789,499, filed Mar. 15, 2013, 32pgs.
Petition for Inter Partes Review of U.S. Pat. No. 11,181,701, *US Conec Ltd.*, Petitioner v. *Senko Advanced Components, Inc.*, Patent Owner, Before the Patent Trial and Appeal Board, Case IPR2024-00121, U.S. Pat. No. 11,181,701, dated Dec. 28, 2023, 112pgs.
"Maelstrom (ride)," Wikipedia, accessed on the internet at https://en.wikipedia.org/wiki/Maelstrom_(ride), retrieved Dec. 27, 2023, 3pgs.
Declaration of William Singhose, PH.D. in Support of Petition for Inter Partes Review of U.S. Pat. No. 11,181,701, *US Conec Ltd.*, Petitioner v. *Senko Advanced Components, Inc.*, Patent Owner, Before the Patent Trial and Appeal Board, Case IPR2024-00121, U.S. Pat. No. 11,181,701, dated Dec. 27, 2023, 330pgs.
"Fiber Optic adapter/Coupler Tutorial," accessed on the internet at https://community.fs.com/article/fiber-optic-adaptercoupler-tutorial.html, retrieved Dec. 21, 2023, 4pgs.
"What Is Optical Fiber Technology, and How Does It Work?," accessed on the internet at https://www.nai-group.com/optical-fiber-technology-how-it-works/, retrieved Dec. 21, 2023, 8pgs.
Petition for Inter Partes Review of U.S. Pat. No. 11,333,836, *US Conec Ltd.*, Petitioner v. *Senko Advanced Components, Inc.*, Patent Owner, Before the Patent Trial and Appeal Board, Case IPR2024-00117, U.S. Pat. No. 11,333,836, dated Dec. 30, 2023, 131pgs.
U.S. Appl. No. 62/546,920, filed Aug. 17, 2017, 76pgs.
U.S. Appl. No. 62/458,042, filed Feb. 13, 2017, 22pgs.
U.S. Appl. No. 62/463,898, filed Feb. 27, 2017, 87pgs.
U.S. Appl. No. 62/457,150, filed Feb. 9, 2017, 76pgs.
U.S. Appl. No. 62/463,901, filed Feb. 27, 2017, 87pgs.
Moxel Adaptor, dated no later than Apr. 22, 2024, 1pg.
Hendrick, "Interface Specification for MDC Receptacle," Feb. 6, 2020, 7pgs.
Declaration of William Singhose, PH.D. in Support of Petition for Inter Partes Review, *US Conec Ltd.*, Petitioner v. *Senko Advanced Components, Inc.*, Patent Owner, Before the Patent Trial and Appeal Board, Case IPR2024-00117, U.S. Pat. No. 11,333,836, 225pgs.
Fiberoad, "QSFP-DD releases Interface Specification," accessed on the internet at https://fiberroad.com/400g-qsfpdd-dco-standards/, retrieved Dec. 30, 2023, 3pgs.
Cabling, "QSFP-DD MSA Group intros new specs, plus white paper," accessed on the internet at https://www.cablinginstall.com/standards/article/14203903/qsfp-dd-msa-group-intros-new-specs-plus-white-paper, retrieved Dec. 30, 2023, 3pgs.
Lightwave, "QSFP-DD MSA Group offers rev 6.0 specifications for QSFPDDS00, QSFP112," accessed on the internet at https://www.lightwaveonline.com/optical-tech/transmission/article/14204021/qsfp-dd-msa-group-offers-rev-60-specifications-for-qsfp-dd800-qsfp112, retrieved Dec. 30, 2023, 4pgs.
Jenkins et al., "Controlling Human Perception of Haptic Profiles Using Contextual Cues," 2023 IEEE World Haptics Conference (WHC), WHC 2023, Delft, Netherlands, Jul. 10-13, 2023, pp. 1-7.
Petition for Inter Partes Review of U.S. Pat. No. 11,415,760, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Jan. 3, 2024, 126pgs.
Patent Owner's Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Apr. 18, 2024, 42pgs.
Assignment of U.S. Appl. No. 14/996,865, Takano, Gniadek to Senko Advanced Components, Inc., dated Jan. 15, 2016, 3pgs.
Assignment of U.S. Appl. No. 14/521,414, Wong, Ruffner to Senko Advanced Components, Inc., dated Apr. 23, 2015, 8pgs.
Declaration of Eric Pearson, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Apr. 17, 2024, 35pgs.
The New. Oxford American Dictionary, $2^{nd}$ ed., Cover and Bibliographic pages, p. 1596 "Slickenslide—Slip," 2005, 4pgs.
Meriam Webster's Collegiate Dictionary, $11^{th}$ ed., Cover and Bibliographic pages, p. 1172 "sleep-slider," 2012, 4pgs.
Webster's New International Dictionary of the English Language, $2^{nd}$ ed., p. 2364, "Slick-Slight," 1947, 4pgs.
Satake, "The History of the MT and its Variations," accessed on the internet at IEEE Xplore, retrieved Oct. 30, 2023, 2pgs.
Nissin Kasei USA Corp., "MPO Connector Kit, Product Specifications," dated no later than Apr. 22, 2024, 9pgs.

(56) References Cited

OTHER PUBLICATIONS

Furukawa Electric, "MT Ferrules," accessed on the internet at https://www.furukawa.eo.jp/telecom/en/product/connector/product/mt.html#:- :text=MT ferrules are key components,wealth of technology and experience., retrieved Nov. 1, 2023, 4pgs.

OCC, "18 Port Rack Mount Fiber Enclosure," accessed on the internet at https://www.computercablestore.com/18-port-rack-mount-fiber-enclosure, retrieved Dec. 18, 2023, 4pgs.

"Rack unit," accessed on the internet https://en.wikipedia.org/wiki/Rack_unit, retrieved Oct. 24, 2023, 5pgs.

Declaration of James F. Brennan III, Ph.D. in Support of Petition for Inter Partes Review, *US Conec Ltd.*, Petitioner v. *Senko Advanced Components, Inc.*, Patent Owner, Before the Patent Trial and Appeal Board, Case IPR2024-00119, U.S. Pat. No. 11,415,760, dated Jan. 3, 2024, 281pgs.

Petition for Inter Partes Review of U.S. Pat. No. 11,061,190, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Jan. 4, 2024, 147pgs.

Patent Owner's Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Mar. 27, 2024, 93pgs.

International Standard, "Fibre optic interconnecting devices and passive components—Fibre optic connector interfaces—Part 20: Type LC connector family," Ed. 2.0, Apr. 2012, 30pgs.

Senko, " The Importance of Proper Crimping in Fiber Optic Assemblies," Application Note, Rev. 01, pp. 1-9, Feb. 2021.

Buijs, Marcel, Fiber Optic Center, "Proper Crimping Techniques are Critical When Terminating Fiber Optic Connectors," FOC Blogs, accessed on the internet https://focenter.com/blog/proper-crimping-techniques-are-critical-when-terminating-fiber-optic-connectors, retrieved Feb. 20, 2024, 7pgs.

Bulgin, "Terminating and crimping for fiber optics:methods and tips," Nov. 25, 2019, accessed on the internet https://community.element14.com/products/manufacturers/bulgin/b/blog/posts/terminating-and-crimping-for-fiber-optics-methods-and-tips, retrieved Feb. 20, 2024, 4pgs.

Cambridge English Dictionary, " Meaning of elongate in English," accessed on the internet https://dictionary.cambridge.org/us/dictionary/english/elongate, retrieved Feb. 20, 2024, 8pgs.

Declaration of Eric Pearson, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Mar. 26, 2024, 115pgs.

Leviton, "Application Note: Understanding Duplex Polarity," 2020, 3pgs.

L-com Fiber Coupler, LC Duplex Bronze Sleeve, Low Profile (SKU_ FOA-802), dated no later than Apr. 22, 2024, 1pg.

Huber+Suhner LC-XD Connector, dated no later than Apr. 22, 2024, 2pgs.

PolyPhaser Fiber Optic Patch Cord Duplex Uniboot LC to LC Single Mode Fiber, OFNR, Yellow 3.0mm Jacket, 5m (SKU_ FPC2LCLC-USMRY30-05), dated no later than Apr. 22, 2024, 2pgs.

Universal LC Fiber Cable—Singlemode 9_125—Plenum 4M with Uniboot LC Connectors (SKU_FODULC-SNG-4m), dated no later than Apr. 22, 2024, 10pgs.

Declaration of James F. Brennan III, Ph.D. in Support of Petition for Inter Partes Review of U.S. Pat. No. 11,061,190, *US Conec Ltd.*, Petitioner v. *Senko Advanced Components, Inc.*, Patent Owner, Before the Patent Trial and Appeal Board, U.S. Pat. No. 11,061,190, IPR2024-00122, dated Jan. 4, 2024, 271pgs.

Petition [1 of 2] for Inter Partes Review of U.S. Pat. No. 11,307,369 [Claims 1-22], *US Conec Ltd.*, Petitioner v. *Senko Advanced Components, Inc.*, Patent Owner, Before the Patent Trial and Appeal Board, Case IPR2024-00115, U.S. Pat. No. 11,307,369, dated Jan. 6, 2024, 121pgs.

Petition [2 of 2] for Inter Partes Review of U.S. Pat. No. 11,307,369 [Claims 23-40], *US Conec Ltd.*, Petitioner v. *Senko Advanced Components, Inc.*, Patent Owner, Before the Patent Trial and Appeal Board, Case IPR2024-00116, U.S. Pat. No. 11,307,369, dated Jan. 6, 2024, 126pgs.

Declaration of James F. Brennan III, Ph.D. in Support of Petition for Inter Partes Review of Claims 23-40 of U.S. Pat. No. 11,307,369, *US Conec Ltd.*, Petitioner v. *Senko Advanced Components, Inc.*, Patent Owner, Before the Patent Trial and Appeal Board, Case IPR2024-00116, U.S. Pat. No. 11,307,369, dated Jan. 5, 2024, 257pgs.

Declaration of James F. Brennan III, Ph.D. in Support of Petition for Inter Partes Review of Claims 1-22 of U.S. Pat. No. 11,307,369, *US Conec Ltd.*, Petitioner v. *Senko Advanced Components, Inc.*, Patent Owner, Before the Patent Trial and Appeal Board, Case IPR2024-00115, U.S. Pat. No. 11,307,369, dated Jan. 5, 2024, 256pgs.

Decision Denying Institution of Inter Partes Review, *US Conec Ltd. V. Senko Advanced Components Inc*, Before the Patent Trial and Appeal Board, Case IPR2024-00122, U.S. Pat. No. 11,061,190, Jun. 5, 2024, 23 pages.

White Paper: SC-RJ—Reliability for Every Category, 2008, 14 pages.

Petition for Post-Grant Review of U.S. Pat. No. 11,733,466, *Senko Advanced Components* v. *US Conec LTD*, Case PGR2024-00032, May 21, 2024, 242 pages.

Declaration of Edward Lurie, *Senko Advanced Components* v. *US Conec LTD*, Case PGR2024-00032, U.S. Pat. No. 11,733,466, May 19, 2024, 310 pages.

U.S. Appl. No. 62/532,710, filed Jul. 14, 2017, 79 pages.

QSFP-DD Hardware Specification, Sep. 19, 2017, 69 pages.

TIA/EI Standard, FOCIS 10 Fiber Optic Connector Intermateability Standard—Type LC, 2002, 38 pages.

CS Connector, May 20, 2024, 8 pages.

Exhibit I, US Conec EX1007, IPR2024-00116, U.S. Pat. No. 11,307,369, dated no later than Apr. 22, 2024; 4pgs.

BSI Standards Publication, Fibre Optic Interconnecting Devices and Components, Part 24, Jan. 2010, 32pgs.

INTL Standard 61754-4 ed1.2b Connector interfaces SC connector, Mar. 2002, 92pgs.

Declaration of Edward M. Cady, Jr., *Senko Advanced Components, Inc.*, Petitioner v. *US Conec Ltd.*, Patent Owner, Before the Patent Trial and Appeal Board, Case IPR2024-01074, U.S. Pat. No. 11,880,075, dated Jun. 19, 2024, 258pgs.

Petition for Inter Partes Review of U.S. Pat. No. 11,880,075, *Senko Advanced Components, Inc.*, Petitioner v. *US Conec Ltd.*, Patent Owner, Before the Patent Trial and Appeal Board, Case IPR2024-01074, U.S. Pat. No. 11,880,075, dated Jun. 20, 2024, 159pgs.

Representative Claim Chart Showing Infringement of U.S. Pat. No. 11,880,075, Mar. 22, 2024, 67pgs.

Declaration of Edward Lurie, *Senko Advanced Components, Inc.*, Petitioner v. *US Conec Ltd.*, Patent Owner, Before the Patent Trial and Appeal Board, Case PGR2024-00037, U.S. Pat. No. 11,906,794, dated Jun. 14, 2024, 311pgs.

Petition for Post-Grant Review of U.S. Pat. No. 11,906,794, *Senko Advanced Components, Inc.*, Petitioner v. *US Conec Ltd.*, Patent Owner, Before the Patent Trial and Appeal Board, Case PGR2024-00037, U.S. Pat. No. 11,906,794, dated Jun. 20, 2024, 270pgs.

U.S. Appl. No. 62/649,539, filed Mar. 28, 2018, 209pgs.

U.S. Appl. No. 62/640,914, filed Mar. 9, 2018, 41pgs.

Senko Advanced Components, "The Importance of Proper Cleaving for Fiber Optic Connectors," Application Engineering Note, Feb. 2022, 10pgs.

Thorlabs, Guide to Connectorization and Polishing Optical Fibers, FN96A, Apr. 17, 2013, 36pgs.

Designerdata Polypropylene, accessed on the internet at https://designerdata.nl/materials/plastics/thermo-plastics/polypropylene-(cop.)?cookie=YES, retrieved Apr. 28, 2024, 2pgs.

Typical Engineering Properties of Polypropylene, INEOS Olefins & Polymers USA, accessed on the internet at www.ineos-op.com, Apr. 2014, 2pgs.

The Engineering ToolBox: Polymers, accessed on the internet at https://www.engineeringtoolbox.com/polymer-properties-d_1222.html, retrieved Apr. 28, 2024, 9pgs.

(56) References Cited

OTHER PUBLICATIONS

Omnexus Plastics & Elastomers, accessed on the internet at https://omnexus.specialchem.com/polymer-property/young-modulus, retrieved Apr. 28, 2024, 14pgs.
U.S. Appl. No. 62/793,198, filed Jan. 16, 2019, 55pgs.
U.S. Appl. No. 62/653,706, filed Apr. 6, 2018, 19pgs.
Exhibit A-1—U.S. Pat. No. 11,733,466 Invalidity Claim Chart, Jun. 21, 2024, 55pgs.
Exhibit A-2—U.S. Pat. No. 11,733,466 Invalidity Claim Chart, Jun. 21, 2024, 43pgs.
Exhibit A-3—U.S. Pat. No. 11,733,466 Invalidity Claim Chart, Jun. 21, 2024, 49pgs.
Exhibit A-4—U.S. Pat. No. 11,733,466 Invalidity Claim Chart, Jun. 21, 2024, 37pgs.
Exhibit B-1—U.S. Pat. No. 11,808,994 Invalidity Claim Chart, Jun. 21, 2024, 38pgs.
Exhibit B-2—U.S. Pat. No. 11,808,994 Invalidity Claim Chart, Jun. 21, 2024, 64pgs.
Exhibit B-3—U.S. Pat. No. 11,808,994 Invalidity Claim Chart, Jun. 21, 2024, 68pgs.
Exhibit B-4—U.S. Pat. No. 11,808,994 Invalidity Claim Chart, Jun. 21, 2024, 53pgs.
Exhibit C-1—U.S. Pat. No. 11,906,794 Invalidity Claim Chart, Jun. 21, 2024, 105pgs.
Exhibit C-2—U.S. Pat. No. 11,906,794 Invalidity Claim Chart, Jun. 21, 2024, 98pgs.
Exhibit C-3—U.S. Pat. No. 11,906,794 Invalidity Claim Chart, Jun. 21, 2024, 105pgs.
Exhibit C-4—U.S. Pat. No. 11,906,794 Invalidity Claim Chart, Jun. 21, 2024, 33pgs.
Exhibit C-5—U.S. Pat. No. 11,906,794 Invalidity Claim Chart, Jun. 21, 2024, 39pgs.
Exhibit C-6—U.S. Pat. No. 11,906,794 Invalidity Claim Chart, Jun. 21, 2024, 22pgs.
Exhibit D-1—U.S. Pat. No. 11,880,075 Invalidity Claim Chart, Jun. 21, 2024, 90pgs.
Exhibit D-2—U.S. Pat. No. 11,880,075 Invalidity Claim Chart, Jun. 21, 2024, 91pgs.
Exhibit D-3—U.S. Pat. No. 11,880,075 Invalidity Claim Chart, Jun. 21, 2024, 86pgs.
Exhibit E-1—U.S. Pat. No. 11,385,415 Invalidity Claim Chart, Jun. 21, 2024, 50pgs.
Exhibit E-2—U.S. Pat. No. 11,385,415 Invalidity Claim Chart, Jun. 21, 2024, 25pgs.
Exhibit E-3—U.S. Pat. No. 11,385,415 Invalidity Claim Chart, Jun. 21, 2024, 57pgs.
Exhibit E-4—U.S. Pat. No. 11,385,415 Invalidity Claim Chart, Jun. 21, 2024, 57pgs.
Exhibit E-5—U.S. Pat. No. 11,385,415 Invalidity Claim Chart, Jun. 21, 2024, 8pgs.
Exhibit F-1—U.S. Pat. No. 10,495,823 Invalidity Claim Chart, Jun. 21, 2024, 29pgs.
Exhibit F-2—U.S. Pat. No. 10,495,823 Invalidity Claim Chart, Jun. 21, 2024, 26pgs.
Exhibit G—Other Validity Grounds (Non-Prior Art), Jun. 21, 2024, 54pgs.
Molex Incorporated, HBMT Motherboard Adapter, Doc. No. SD-106105-100MX, Oct. 31, 2005, 2pgs.
EX1027—Meriam Webster's Collegiate Dictionary, $11^{th}$ ed., Cover and Bibliographic pages, p.551 "groove," 2003, 4pgs.
EX1028—The Deposition of Witness, William Singhose, Ph.D, The United States International Trade Commission, Investigation No. 337-TA, Sep. 9, 2024', 82pgs.
EX1028—QSFP-DD, "Thermal Whitepaper: Enabling QSFP-001600 Ecosystem With Performance-Driven Thermal Innovations," accessed on the internet at www.qsfp-dd.com/wp-content/uploads/, retrieved Aug. 6, 2024, 12pgs.
EX1029—Representative Domestic Industry Claim Chart for U.S. Pat. No. 11,385,415 by MMC Adapters, Aug. 19, 2024, 5pgs.
EX2002—Molex Adaptor, Jul. 24, 2024, 1pg.
EX2003—Encyclopedia.com, Definition of Frame, accessed on the internet at https://www.encyclopedia.com/science-and-technology/computers-and-electrical-engineering/computers-and-computing/frame, retrieved Jul. 23, 2024, 12pgs.
Exhibit 1002—Declaration of Edward Lurie, *Senko Advanced Components, Inc.*, Petitioner v. *US Conec Ltd.*, Patent Owner, Before the Patent Trial and Appeal Board, Case PGR2024-00046, U.S. Pat. No. 11,808,994, dated Jul. 10, 2024, 362pgs.
Exhibit 1016—MOLEX—SFP-DD Hardware Specification for SFP Double Density 2x Pluggable Transceiver, Rev 1.0, Sep. 14, 2017, 50pgs.
Exhibit 1028—Tutorials Of Fiber Optic Products, "Fiber Optic Connector Polishing," accessed on the internet at https://www.fiber-optic-tutorial.com/category/network-solutions/fiber-optic-polishing, retrieved Jun. 4, 2024, 6pgs.
Exhibit 1029—Fiber Cabling Solution, "UPC or APC—Which One to Choose?," accessed on the internet at https://www.fiber-optic-cable-sale.com/upc-or-apc-which-one-to-choose.html, retrieved Jun. 4, 2024, 3pgs.
Exhibit 1030—Belden, "APC vs. UPC: What's the Difference?," accessed on the internet at https://www.belden.com/blogs/upc-or-apc#:~:text=The main difference between APC,curvature for better core alignment 1, retrieved Jun. 4, 2024, 3pgs.
Exhibit 1035—QSFP-DD, "QSFP-DD MSA Group Announces New Hardware Specification," accessed on the internet at www.qsfp-dd.com/qsfp-dd-msa-group-announces-new-hardware-specification/, retrieved Jul. 10, 2024, 2pgs.
Exhibit 1036—QSFP-DD, "QSFP-DD MSA Group Announces New Hardware Specification," Internet Archive WayBack Machine, accessed on the internet at www.qsfp-dd.com/qsfp-dd-msa-group-announces-new-hardware-specification/, retrieved Oct. 29, 2017, 2pgs.
Exhibit 1037—SFP-DD, SFP-DD MSA Releases Specification for High-Speed, High-Density Interface, accessed on the internet at sfp-dd.com/2017/09/sfp-dd-msa-releases-specification-for-high-speed-high-density-interface/, retrieved Jul. 10, 2024, 4pgs.
Exhibit 1038—SFP-DD, SFP-DD MSA Releases Specification for High-Speed, High-Density Interface, Internet Archive WayBack Machine, accessed on the internet at sfp-dd.com/2017/09/sfp-dd-msa-releases-specification-for-high-speed-high-density-interface/, retrieved Oct. 15, 2017, 3pgs.
Patent Owner's Preliminary Response Under 37 C.F.R. § 42.107(a), *Senko Advanced Components, Inc.*, Petitioner v. *US Conec Ltd.*, Patent Owner, Before the Patent Trial and Appeal Board, Case IPR2024-00805, U.S. Pat. No. 11,385,415, dated Jul. 24, 2024, 44pgs.
Petition For Post-Grant Review of U.S. Pat. No. 11,808,994, *Senko Advanced Components, Inc.*, Petitioner v. *US Conec Ltd.*, Patent Owner, Before the Patent Trial and Appeal Board, Case PGR2024-00046, U.S. Pat. No. 11,808,994, dated Jul. 23, 2024, 266pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00117, U.S. Pat. No. 11,333,836 B2, dated Jul. 9, 2024, 25pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00118, U.S. Pat. No. 11,340,413 B2, dated Jul. 9, 2024, 28pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00120, U.S. Pat. No. 10,191,230 C1, dated Jul. 9, 2024, 44pgs.
Paper 6, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00121, U.S. Pat. No. 11,181,701 B2, dated Jul. 9, 2024, 26pgs.
Paper 7, Decision Granting Institution of Inter Partes Review 35 U.S.C. § 314, *US Conec Ltd.*, Petitioner v. *Senko Advanced Com-

(56) References Cited

OTHER PUBLICATIONS

*ponents, Inc.*, Patent Owner, Before the Patent Trial and Appeal Board, Case IPR2024-00115, U.S. Pat. No. 11,307,369 B2, dated Jul. 9, 2024, 20pgs.

Paper 7, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00116, U.S. Pat. No. 11,307,369 B2, dated Jul. 9, 2024, 16pgs.

Petitioner's Reply to Preliminary Response to the Petition for Inter Partes Review, *US Conec Ltd.*, Petitioner v. *Senko Advanced Components, Inc.*, Patent Owner, Before the Patent Trial and Appeal Board, Case IPR2024-00805, U.S. Pat. No. 11,385,415, dated Aug. 19, 2024, 10pgs.

Petitioner's Request for Rehearing of the Institution Decision, *US Conec Ltd.*, Petitioner v. *Senko Advanced Components, Inc.*, Patent Owner, Before the Patent Trial and Appeal Board, Case IPR2024-00122, U.S. Pat. No. 11,061,190, dated Jul. 5, 2024, 19pgs.

Paper 9, Decision Granting Institution of Inter Partes Review 35 U.S.C. § 314, *US Conec Ltd.*, Petitioner v. *Senko Advanced Components, Inc.*, Patent Owner, Before the Patent Trial and Appeal Board, Case IPR2024-00119, U.S. Pat. No. 11,415,760 B2, dated Jul. 9, 2024, 41pgs.

\* cited by examiner

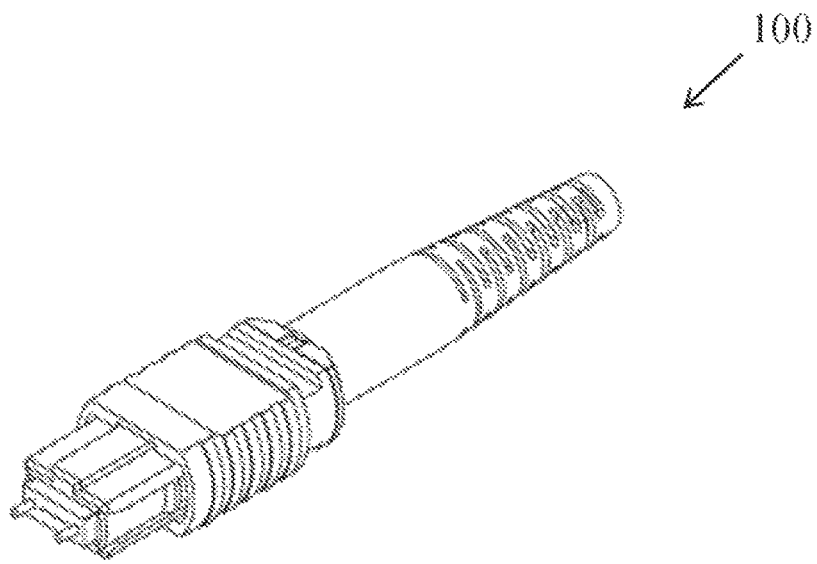
FIG. 1A
(Prior Art)
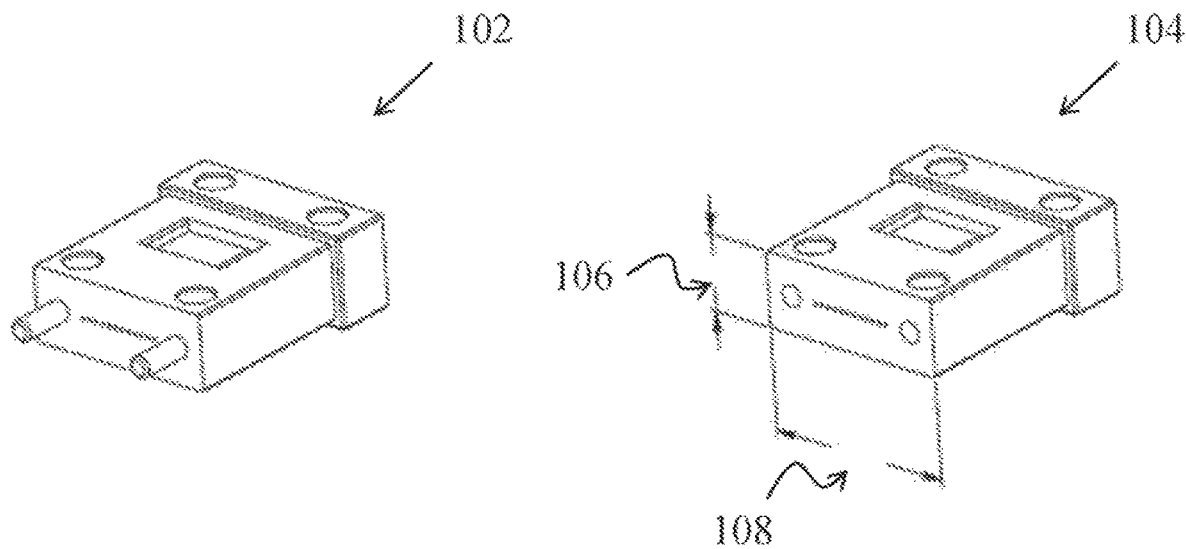
FIG. 1B
(Prior Art)
FIG. 1C
(Prior Art)

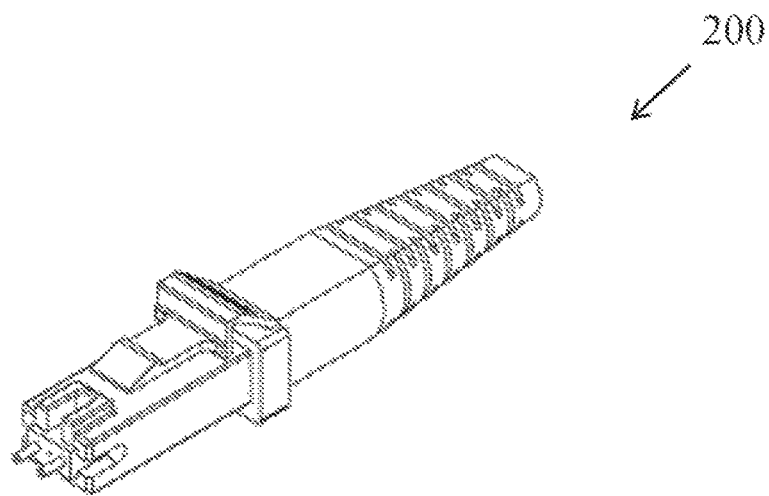
FIG. 2A
(Prior Art)
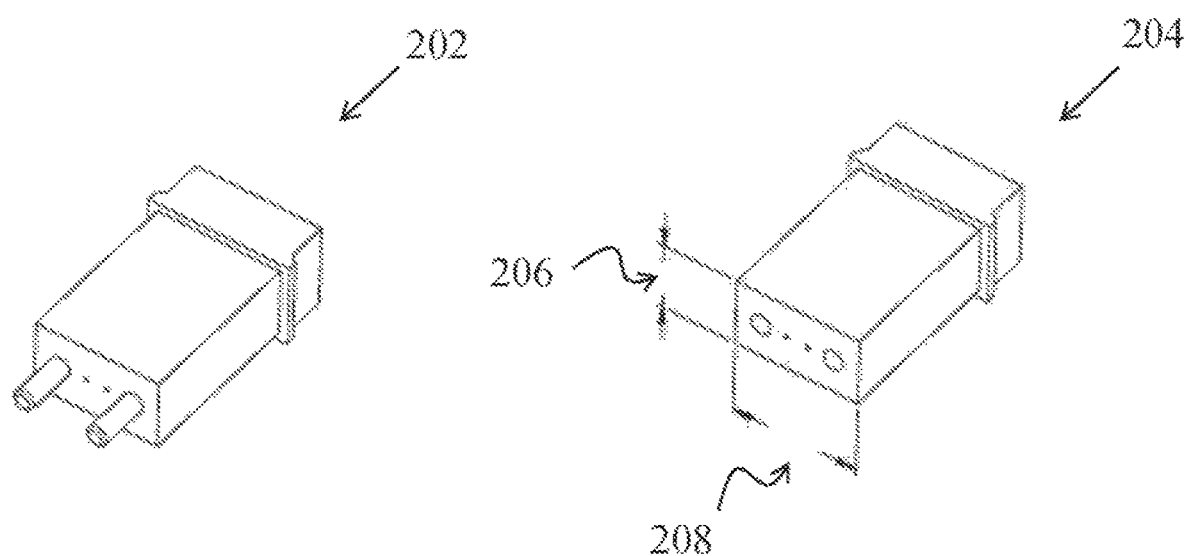
FIG. 2B
(Prior Art)
FIG. 2C
(Prior Art)

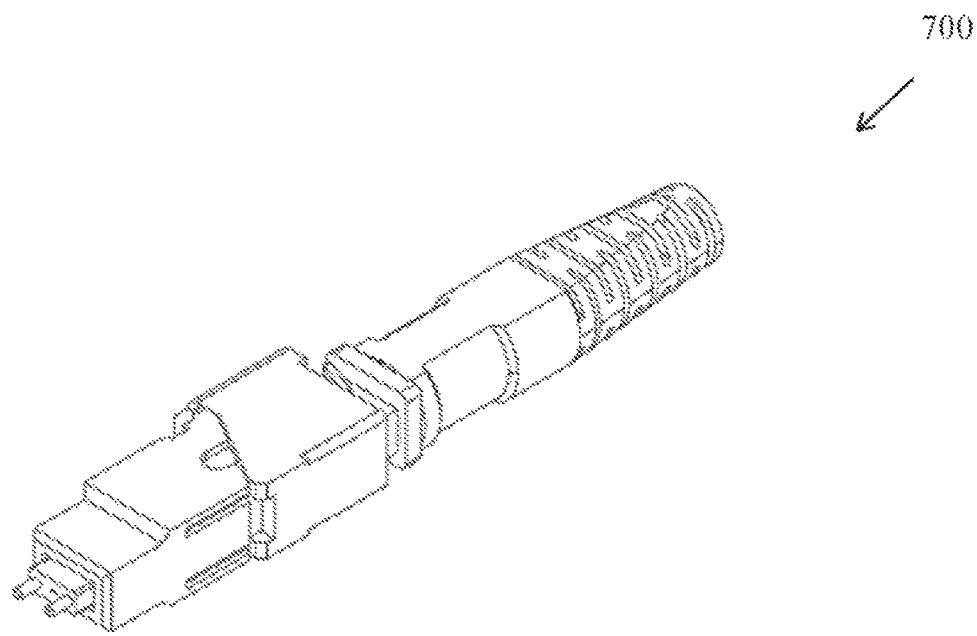
FIG. 7A
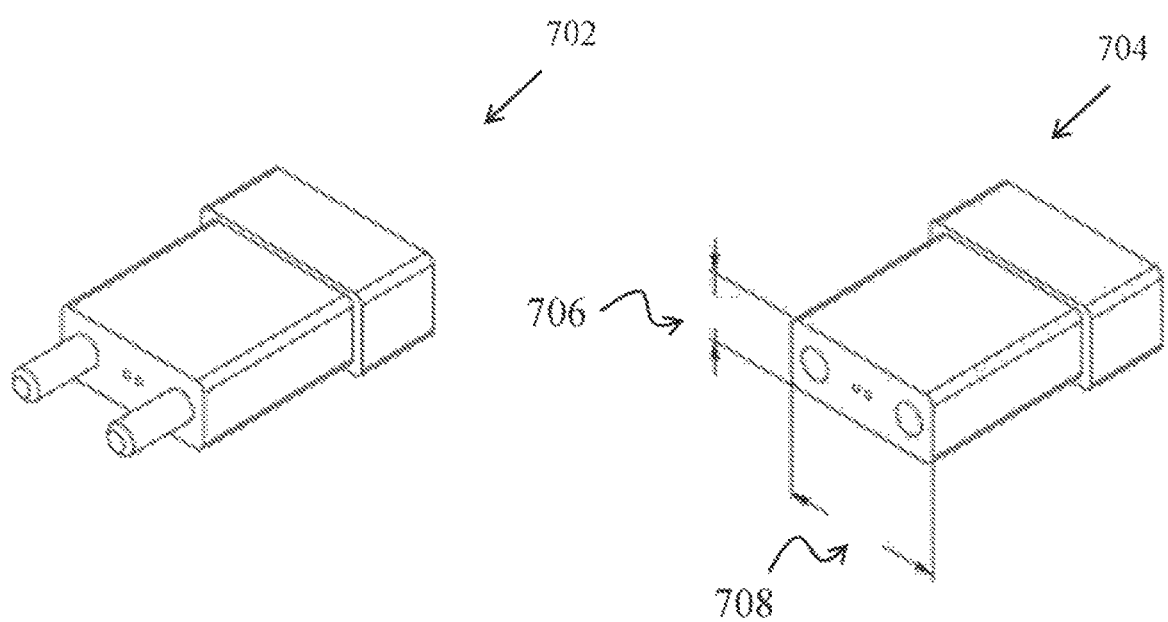
FIG. 7B
FIG. 7C

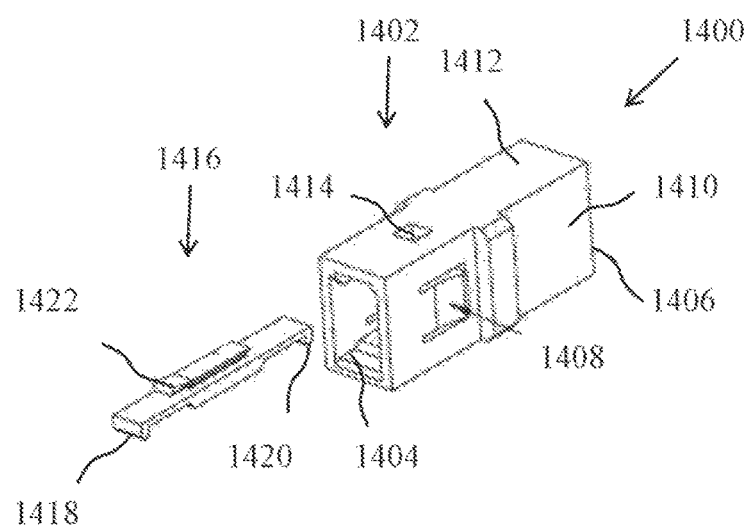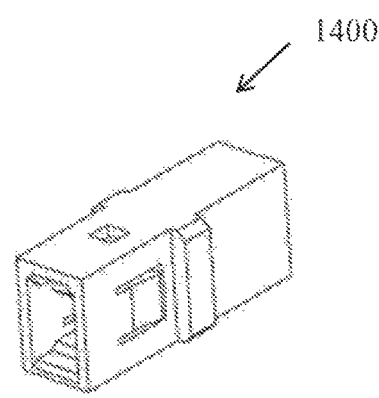
FIG. 17A  FIG. 17B
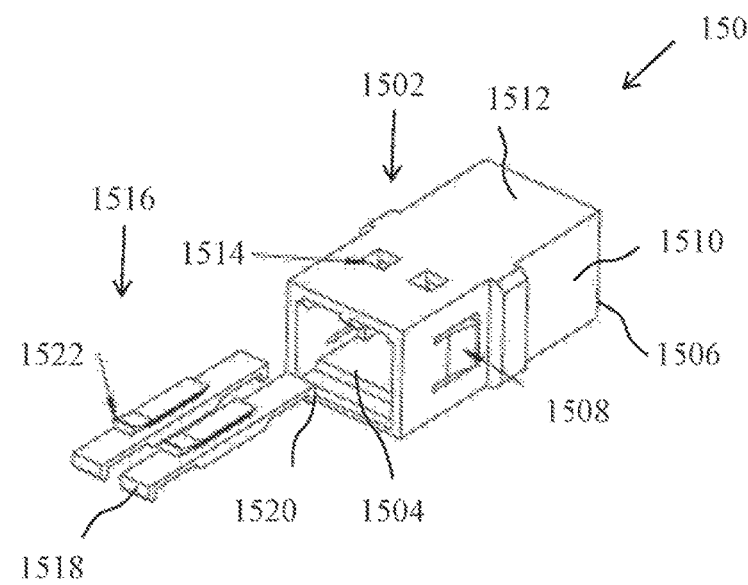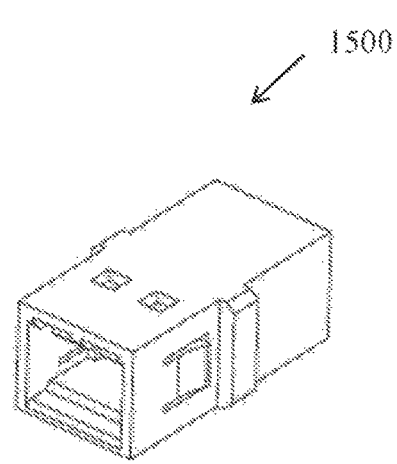
FIG. 18A  FIG. 18B

ADAPTER SYSTEM FOR MULTI-FIBER MECHANICAL TRANSFER TYPE FERRULE

CROSS-REFERENCE TO RELATED APPLICATIONS

This application is a continuation of U.S. application Ser. No. 17/115,975 filed Dec. 9, 2020, which is a continuation of U.S. application Ser. No. 16/123,381, filed Sep. 6, 2018, now U.S. Pat. No. 10,866,371 issued on Dec. 15, 2020, which is a continuation of U.S. application Ser. No. 16/016,577 filed Jun. 23, 2018, now U.S. Pat. No. 10,107,972 issued on Oct. 23, 2018, a continuation of U.S. application Ser. No. 15/670,161 filed Aug. 7, 2017, now U.S. Pat. No. 10,078,187, issued on Sep. 18, 2018, which is a continuation of U.S. application Ser. No. 15/195,405 filed Jun. 28, 2016, now U.S. Pat. No. 9,726,830, issued on Aug. 8, 2017 and all are incorporated in their entireties.

FIELD OF THE INVENTION

The present teaching relates generally to connectors and adaptors for two-fiber mechanical transfer type ferrules, and more specifically to micro connectors and adaptors, such as simplex, duplex and quad micro connectors and adaptors with remote release and two-fiber ferrules.

BACKGROUND

The prevalence of the Internet has led to unprecedented growth in communication networks. Consumer demand for service and increased competition has caused network providers to continuously find ways to improve quality of service while reducing cost.

Certain solutions have included the deployment of high-density network panels. These panels are designed to consolidate the increasing volume of interconnections necessary to support the fast-growing networks into a compacted space, thereby increasing quality of service and decreasing costs such as floor space and support overhead. High-density network panels may contain a large number of ports to accommodate the large number of connections often necessary to connect the network panels with the network switches or other network end terminals. The panels' ports are generally designed to mate with connectors that contain two fibers (herein referred to as a 2-fiber connector) where one fiber transmits data (Tx) and the other fiber receives data (Rx). It is common to have a number of 2-fiber connectors, such as six 2-fiber connectors, from the network panel combined together into a fan-out jumper. In this design, the 2-fiber connectors and their fibers couple through a fan-out block and into a single cable, such as a 12-fiber cable. A multi-fiber push-on (MPO) connector, such as a 12-fiber MPO connector, is usually mounted at the end of the single cable to connect to a transceiver located at the network switch or other network end terminal. The transceiver can then manage a large number of fibers and 2-fiber connectors using the fan-out jumper and connect to a large number of pores from the network panels. However, the design, the connector dimensions and the connector accessibility of the presently available fan-out jumpers have not been fully optimized for high-density network panels.

Fan-out jumpers with 2-fiber Tx-Rx connectors may require individual ports for each Tx-Rx network connection; however, due to their design, they may create fiber management and maintenance issues for the operator that are challenging and undesirable. For instance, in a fan-out jumper with one 12-fiber MPO connector and six 2-fiber connectors, the MPO connector activates all 12 fibers as soon as it is plugged into the transceiver. However, this is convenient if there are six Tx-Rx ports that need service simultaneously on the network panel. This can cause some or all of the six Tx-Rx ports to become interrupted due to a malfunction with the MPO connector at the transceiver. Moreover, repairing the MPO connector will interrupt all 6 Tx-Rx ports as soon as the MPO connector is unplugged for troubleshooting, which may lead to an unnecessary interruption of services. Furthermore, if the network switch has 12-fiber MPO type transceivers and only one network panel Tx-Rx port coupled to a 2-fiber jumper connector needs service, this results in five additional 2-fiber connectors that are "active" but not utilized from the cable jumper. The unused but active 2-fiber connectors then need to be stored along with some lengths of 2-fiber cables until a future need is realized, adding to the fiber management problems. Additionally, 2-fiber connectors from one 12-fiber MPO fan-out jumper may not be able to reach Tx-Rx ports on the network panel needing service, in which case another transceiver would need to be powered up and another 12-fiber MPO fan-out. jumper would need to be added to the equipment racks. If the length of the 12-fiber MPO fan-out jumper was determined based on the Tx-Rx port farthest from the transceiver, then there would be excessively long 2-fiber connector cables to manage when nearby Tx-Rx ports are serviced, again adding to the problem of fiber management. It is most desired to manage or "dress" the cables in horizontal and vertical cable troughs and not crossover the equipment in diagonal "short-cuts", as this causes equipment access and cable identification problems.

Certain available ferrules and connectors may be designed to couple with fan-out jumper and high-density network panels but. their dimensions are not optimized for 2-fiber applications. For instance, MPO connectors are commonly configured for 2 to 36 fiber ribbon cables and are therefore much bigger than what. is needed for two fiber applications with the same fiber-to-fiber center distance of about 0.25 mm. MPO connectors are about. 7.6 mm high, 12.4 mm wide, 25.7 mm long (without including the strain relief boot), and MPO ferrules have a frontal contact surface of about 2.5 mm high and 6.4 mm wide. In contrast, MT-RJ connectors are configured for cable with a smaller number of fiber ribbons, such as 1 to 4 fibers, but they are larger than what is needed for two-fiber applications. MT-RJ connectors are about 10 mm high, 9.2 mm wide, 20 mm long (without including the strain relief boot), and MT-RJ ferrules have a frontal contact surface of about 2.5 mm high and 4.4 mm wide. Also, LC and SC duplex connectors may be designed for 2-fiber applications but their overall dimensions are not optimized to address the high-density requirement of high-density network panels. LC duplex connectors are about 12.7 mm high, 12.8 mm wide, 27.3 mm long (without including the strain relief boot), and SC duplex connectors are about 9.3 mm high, 24.2 mm wide, 25.2 mm long (without including the strain relief boot).

For 2-fiber jumper connectors coupled to fan-out jumpers and high-density network panels, adjacent connectors and cable assemblies may obstruct access to the individual release mechanisms at the Tx-Rx network panel port. Such physical obstructions may impede the ability of an operator to minimize the stresses applied to the cables and the connectors. For example, these stresses may be applied when the user reaches into a dense group of jumper connectors and pushes aside surrounding cables to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into the dense group of 2-fiber jumper connectors and activate the release mechanism, the adjacent cables and connectors may obstruct the operator's line of sight, making it difficult to guide the tool to the release mechanism without pushing aside the surrounding cables. Moreover, even when the operator has a clear line of sight, guiding the tool to the release mechanism may be a time-consuming process. Thus, using a tool may net be effective at reducing support time and increasing the quality of service.

Accordingly, there remains a critical need for a better designed fan-out jumper that meets the requirements of high-density network panels.

SUMMARY

In one aspect, a connector is disclosed for two-fiber mechanical transfer type ferrule. The connector may comprise, for example and without limitation, at least one housing, a latch body, at least one latch spring, at least one ferrule, at least one ferrule spring, and a pull-tab. The connector can be, for example and without limitation, a micro-mechanical transfer (micro-MT) type connector, and more specifically a simplex micro-MT connector, a duplex micro-MT connector, or a quad micro-MT connector.

In some embodiments, the micro-MT connector contains at least one ferrule. The ferrule can be a micro-MT ferrule, and more specifically a male micro-MT ferrule or a female micro-MT ferrule. The male micro-MT ferrule and the female micro-MT ferrule have a contact surface with a height in a range of about 1.0 mm to about 2.4 mm, such as a height of about 2.0 mm, or a height of about 1.6 mm. The male micro-MT ferrule and the female micro-MT ferrule have a contact surface with a width in a range of about 2.4 mm to about 4.3 mm, such a width of about 4.0 mm or a width of about 3.6 mm.

In some embodiments, the micro-MT connector is a simplex micro-MT connector comprising a housing defining a longitudinal passage therethrough. The simplex micro-MT connector comprises a latch body defining a longitudinal passage therethrough and being movably coupled to the housing. The simplex micro-MT connector comprises a latch spring defining a longitudinal passage therethrough and being movably coupled with the housing. The simplex micro-MT connector comprises one ferrule extending longitudinally from a first end to a second end, the ferrule disposed at least partially within the longitudinal passage of the housing with the first end protruding external to the longitudinal passage. The simplex micro-MT connector comprises a ferrule spring dispersed in the longitudinal passage of the housing and coupled to the ferrule.

In some embodiments, the micro-MT connector is a simplex micro-MT connector having a height in a range of about 3.8 mm to about 7.5 mm, such a height of about 6.5 mm or a height of about 5.5 mm. The simplex micro-MT connector has a width in a range of about 6.4 mm to about 9.1 mm, such a width of about 8.8 mm or a width of about 8.5 mm. The simplex micro-MT connector has a length in a range of about 17.0 mm to about 25.1 mm, such a length of about 23.2 mm or a length of about 21.3 mm.

In some embodiments, the micro-MT connector is a simplex micro-MT connector comprising a pull-tab. The pull-tab comprises a proximal end and a distal end spaced from the proximal end. The proximal end may include a latch hook uniquely shaped so as to engage with the unique profile of the latch body that is integral to the simplex micro-MT connector.

In some embodiments, the micro-MT connector is a simplex micro-MT connector comprising a latch body and a latch spring. When the simplex micro-MT connector is coupled to an adaptor, the latch spring is not compressed and therefore not actuated. A latch hole from the housing and a latch hole from the latch body are disposed vertically, one above each other, to generate a large cavity where a latch from the adaptor can couple to fasten the connector to the adaptor. In contrast, when the simplex micro-MT connector is decoupled from an adaptor, the latch spring is compressed and therefore actuated. The latch hole from the housing and the latch hole from the latch body are not disposed vertically, one above each other, and do not generate a large enough cavity where the latch from the adaptor can couple to fasten the connector to the adaptor.

In some embodiments, the micro-MT connector is a duplex micro-MT connector comprising a first housing and a second housing each defining a longitudinal passage therethrough from a proximal end to a distal end and including a latch hole designed to couple with a latch arm from an adaptor. The duplex micro-MT connector comprises a latch body defining a first longitudinal passage therethrough from a proximal end to a distal end spaced from the first end, a second longitudinal passage therethrough from a middle to the distal end spaced from the middle. The latch body is movably coupled with the housings wherein at least part of the housing is movably within at least the first longitudinal passage of the latch body. The duplex micro-MT connector comprises a latch spring defining a longitudinal passage therethrough and being movably coupled with the housing. The duplex micro-MT connector comprises a first ferrule and a second ferrule each extending longitudinally from a first end to a second end, the ferrule disposed at least partially within the longitudinal passage of the housing with the first end protruding external to the longitudinal passage. The duplex micro-MT connector comprises a first ferrule spring and a second ferrule spring each dispersed in the longitudinal passage of the housing and coupled to the ferrule.

In some embodiments, the micro-MT connector is a duplex micro-MT connector having a height in a range of about 7.8 mm to about 13.8 mm, such as a height of about 12.8 mm or a height of about 11.8 mm. The duplex micro-MT connector has a width in a range of about 6.4 mm to about 9.1 mm, such as a width of about 8.8 mm or a width of about 8.5 mm. The duplex micro-MT connector has a length in a range of about 19.4 mm to about 29.0 mm, such as a length of about 27.0 mm or a length of about 25.0 mm.

In some embodiments, the micro-MT connector is a duplex micro-MT connector comprising a pull-tab. The pull-tab comprises a proximal end and a distal end spaced from the proximal end. The proximal end may include a first latch hook and a second latch hook uniquely shaped so as to engage with the unique profile of the latch body that is integral to the duplex micro-MT connector.

In some embodiments, the micro-MT connector is a quad micro-MT connector comprising a first housing and a second housing and a third housing and a fourth housing each defining a longitudinal passage therethrough from a proximal end to a distal end and including a latch hole designed to couple with a latch arm from an adaptor. The quad micro-MT connector comprises a latch body defining a first longitudinal passage therethrough from a proximal end to a distal end, a second longitudinal passage therethrough from a middle to the distal end. The latch body is movably coupled with the housings wherein at least part of the housing is movably within at least the first longitudinal passage of the latch body. The quad micro-MT connector comprises a first latch spring and a second latch spring each defining a longitudinal passage therethrough and being movably coupled with the housing. The quad micro-MT connector comprises a first ferrule and a second ferrule and a third ferrule and a fourth ferrule each extending longitudinally from a first end to a second end, the ferrule disposed at least partially within the longitudinal passage of the housing with the first end protruding external to the longitudinal passage. The quad micro-MT connector comprises a first ferrule spring and second ferrule spring and a third ferrule spring and a fourth ferrule spring each dispersed in the longitudinal passage of the housing and coupled to the ferrule.

In some embodiments, the micro-MT connector is a quad micro-MT connector having a height in a range of about 7.8 mm to about 13.8 mm, such as a height of about 12.8 mm or a height of about 11.8 mm. The quad micro-MT connector has a width in a range of about 12.8 mm to about 21.2 mm, such as a width of about 20.2 mm or a width of about 19.2 mm. The quad micro-MT connector has a length in a range of about 19.4 mm to about 29.0 mm, such as a length of about 27.0 mm or a length of about 25.0 mm.

In some embodiments, the micro-MT connector is a quad micro-MT connector comprising a pull-tab. The pull tab comprises a proximal end and a distal end spaced from the proximal end. The proximal end may include a first latch hook and a second latch hook uniquely shaped so as to engage with the unique profile of the latch body that is integral to the quad micro-MT connector.

In another aspect, an adaptor is disclosed for two-fiber mechanical transfer type ferrule. The adaptor may comprise, for example and without limitation, a housing and at least one latch hook arm. The adaptor can be, for example and without limitation, a micro-mechanical transfer (micro-MT) type adaptor, and more specifically a simplex micro-MT adaptor, a duplex micro-MT adaptor, or a quad micro-MT adaptor.

In some embodiments, the micro-MT adaptor is a simplex micro-MT adaptor comprising a housing defining a longitudinal passage therethrough, the housing comprising at least one mounting tab, wherein a first wall, a second wall, a third wall, and a fourth wall, wherein the first wall and the third wall are opposite to each other, wherein the second wall and the fourth wall are opposite to each other, and wherein the second wall comprises at least one adaptor housing hole. The simplex micro-MT adaptor comprises a latch-hook arm defined by a first side, a second side, a first end, and a second end spaced from the first end, wherein the first end and the second end each comprise a first hook configured to couple with the connector, wherein one of the sides comprises a second hook to couple with an adaptor housing hole.

In some embodiments, the micro-MT adaptor is a simplex micro-MT adaptor, which may have a length in a range of about 22 mm to about 28 mm, such as a length of about 27 mm or a length of about 26 mm. The simplex micro-MT adaptor may have a height in a range of about 4 mm to about 10 mm, such as a height of about 9 mm or a height of about 8 mm. The simplex micro-MT adaptor may have a width in a range of about 7.2 mm to about 13.2 mm, such as a width of about 12.2 mm or a width of about 11.2 mm. The simplex micro-MT adaptor may have mounting handles and a height in a range of about 7 mm to about 13 mm, such as a height of about 12 mm or a height of about 11 mm.

In some embodiments, the micro-MT adaptor is a duplex micro-MT adaptor comprising a housing defining a longitudinal passage therethrough, the housing comprising at least one mounting tab, wherein a first wall, a second wall, a third wall, and a fourth wall, wherein the first wall and the third wall are opposite to each other, wherein the second wall and the fourth wall are opposite to each other, and wherein the second wall comprises at least one adaptor housing hole. The duplex micro-MT adaptor comprises two latch-hook arms each defined by a first side, a second side, a first end, and a second end spaced from the first end, wherein the first end and the second end each comprise a first hook configured to couple with the connector, wherein one of the sides comprises a second hook to couple with an adaptor housing hole.

In some embodiments, the micro-MT adaptor is a duplex micro-MT adaptor, which may have a length in a range of about 22 mm to about 28 mm, such as a length of about 27 mm or a length of about 26 mm. The duplex micro-MT adaptor may have a height in a range of about 9 mm to about 15 mm, such as a height of about 14 mm or a height of about 13 mm. The duplex micro-MT adaptor may have a width in a range of about 7.2 mm to about 13.2 mm, such as a width of about 12.2 mm or a width of about 11.2 mm. The duplex micro-MT adaptor may have mounting handles and a height in a range of about 12 mm to about 18 mm, such as a height of about 17 mm or a height of about 16 mm. The duplex micro-MT adaptor may have flanges and a height in a range of about 18 mm to about 24 mm, such as a height of about 23 mm or a height of about 22 mm.

In some embodiments, the micro-MT adaptor is a quad micro-MT adaptor comprising a housing defining a longitudinal passage therethrough, the housing comprising at least one mounting tab, wherein a first wall, a second wall, a third wall, and a fourth wall, wherein the first wall and the third wall are opposite to each other, wherein the second wall and the fourth wall are opposite to each other, and wherein the second wall comprises at least one adaptor housing hole. The quad micro-MT adaptor comprises four latch-hook arms each defined by a first side, a second side, a first end, and a second end spaced from the first end, wherein the first end and the second end each comprise a first hook configured to couple with the connector, wherein one of the sides comprises a second hook to couple with an adaptor housing hole.

In some embodiments, the micro-MT adaptor is a quad micro-MT adaptor, which may have a length in a range of about 22 mm to about 28 mm, such as a length of about 27 mm or a length of about 26 mm. The quad micro-MT adaptor may have a height in a range of about 15.3 m. In to about 21.3 mm, such as a height of about 20.3 mm or a height of about 19.3 mm. The duplex micro-MT adapt or may have a width in a range of about 9 mm to about 15 mm, such as a width of about 14 mm or a width of about 13 mm. The duplex micro-MT adaptor may have mounting handles and a height in a range of about 18.3 mm to about 24.3 mm, such as a height of about 23.3 mm or a height of about 22.3 mm. The duplex micro-MT adaptor may have flanges and a height in a range of about 24.5 mm to about 30.5 mm, such as a height of about 29.5 mm or a height of about 28.5 mm.

In another aspect, a micro-MT adaptor is used to couple at least one micro-MT connector. The connector can be, for example and without limitation, a micro-MT type connector, and more specifically a simplex micro-MT connector, a duplex micro-MT connector, or a quad micro-MT connector. The adaptor can be, for example and without limitation, a micro-MT type adaptor, and more specifically a simplex micro-MT adaptor, a duplex micro-MT adaptor, or a quad micro-MT adaptor.

In some embodiments, the micro-MT adaptor is a duplex micro-MT adaptor coupling with a duplex micro-MT connector, a first simplex micro-MT connector, and a second simplex micro-MT connector.

In some embodiments, the micro-MT adaptor is a quad micro-MT adaptor coupling with a first simplex micro-MT connector, a second simplex micro-MT connector, a duplex micro-MT connector, and a quad micro-MT connector.

BRIEF DESCRIPTION OF THE DRAWINGS

FIG. 1A is a perspective view of a prior art standard MPO connector;

FIG. 1B is a perspective view of a prior art standard MPO male ferrule;

FIG. 1C is a perspective view of a prior art standard MPO female ferrule;

FIG. 2A is a perspective view of a prior art standard MT-RJ connector;

FIG. 2B is a perspective view of a prior art standard MT-RJ male ferrule;

FIG. 2C is a perspective view of a prior art standard MT-RJ female ferrule;

FIG. 7A is a perspective view of one embodiment of a simplex micro-MT connector according to aspects of the present disclosure;

FIG. 7B is a perspective view of one embodiment of a micro-MT male ferrule according to aspects of the present disclosure;

FIG. 7C is a perspective view of one embodiment of a micro-MT female ferrule according to aspects of the present disclosure;

FIG. 17A is an exploded view of one embodiment of a simplex micro-MT adapter according to aspects of the present disclosure;

FIG. 17B is a perspective view of one embodiment of a simplex micro-MT adapter according to aspects of the present disclosure;

FIG. 18A is an exploded view of one embodiment of a duplex micro-MT adapter according to aspects of the present disclosure;

FIG. 18B is a perspective view of one embodiment of a duplex micro-MT adapter according to aspects of the present disclosure;

DETAILED DESCRIPTION

Figure 1D:
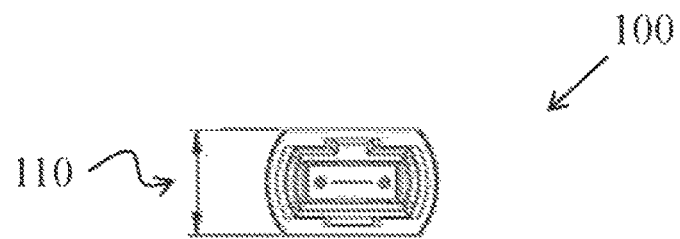
FIG. 1D is a front view of a prior art standard MPO connector.

Certain exemplary embodiments will now be described to provide an overall understanding of the principles of the structure, function, and use of the devices and methods disclosed herein. One or more examples of these embodiments are illustrated in accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such embodiments and variations are intended to be included within the scope of the present invention.

So that the present invention may more readily be understood, certain terms are first defined.

As used herein, the terms "about" or "approximately" or "substantially" for any numerical values or ranges indicate a suitable dimensional tolerance that allows the part or collection of elements to function for its intended purpose as described herein. These terms indicate a ±10% variation about a central value.

The term "ferrule" is used herein consistent with its customary meaning in the art to refer to a device and/or components thereof that connect optical fibers.

The term "connector" is used herein consistent with its customary meaning in the art to refer to a device and/or components thereof that connects a first module or cable to a second module or cable. The connectors may be configured for fiber optic transmission or electrical signal transmission. The connector may be any suitable type now known or later developed such as, for example and without any limitation, a ferrule connector (FC), a fiber distributed data interface (FDDI) connector, a LC connector, a mechanical transfer (MT) connector, a mechanical transfer registered jack (MT-RJ) connector, a SC connector, a SC duplex connector, a straight tip (ST) connector, a multiple-fiber push-on (MPO) connector, or a media interface connector (MIC).

The term "adaptor" is used herein consistent with its customary meaning in the art to refer to a device and/or components thereof that couples a first module or cable or set of cables with a second module or cable or set of cables.

The term "cable" is used herein consistent with its customary meaning in the art to refer to an insulated wire or wires comprising a protective casing (e.g., a jacket, a sheathing material) and used for transmitting electricity or telecommunication signals. A "fiber optic cable" or an "optical cable" referred herein to a cable containing one or more optical fibers for conducting optical signals in beams of light. The optical fibers can be constructed from any suitable transparent material, including glass, fiberglass, and plastic. In addition, the cable can be connected to a connector on one end or on both ends of the cable, the cable can be coupled to an adaptor on one end or on both ends of the cable, and the cable can be connected to another cable on one end or on both ends of the cable.

The term "jumper" is used herein consistent with its customary meaning in the art to refer to a device and/or components thereof that connect multicore cables.

The term "panel" is used herein consistent with its customary meaning in the art to refer to a device and/or components thereof that connect incoming and outgoing lines of communication cables.

The present application relates generally to devices and methods for connecting optical fibers. For example and without any limitation, the various devices and methods of the invention can be utilized to optimize the connections between ports in high-density network panels by increasing the accessibility to the connectors by the operator and by reducing the number of connector cables, the length of the connector cables, the number of connector cables that are dressed crossover to the equipment, and the dimension of the connectors. As discussed in more detail below, in some embodiments, optical fiber cables can be modularly coupled with one or more optical fiber connectors, adaptors, and other optical fiber cables using a remote release. Various aspects of the prior art and invention are described below.

Those in the art will understand that the devices and methods described herein are more suitable at least for 2-fiber cable and high-density network panel applications than the devices and methods described in the prior art.

Figure 1E:
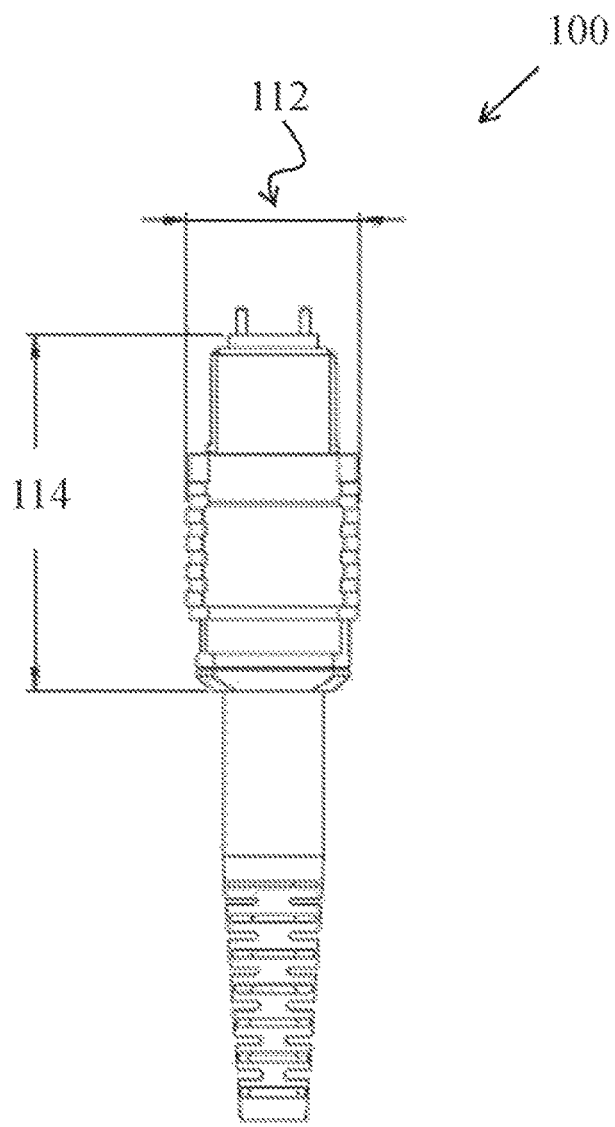
FIG. 1E is a top view of a prior art standard MPO connector.

For instance, as shown in FIG. 1A, a conventional MPO connector 100 is commonly configured for 2 to 36 fiber ribbon cables and is therefore much bigger than what is needed for 2-fiber applications with the same fiber-to-fiber center distance of about 0.25 mm. The conventional MPO Connector 100 is mounted with a male MPO ferrule 102 as shown in FIG. 1B or a female MPO ferrule 104 as shown in FIG. 1C, and the MPO ferrules have a frontal contact surface height 106 of about 2.5 mm and a frontal contact surface width 108 of about 6.4 mm. FIG. 1D shows a front view of the conventional MPO connector 100 with a height 110 of about 7.6 mm, and FIG. 1E shows a side view of the conventional MPO connector 100 with a width 112 of about 12.4 mm and a length 114 of about 25.7 mm.

Figure 2D:
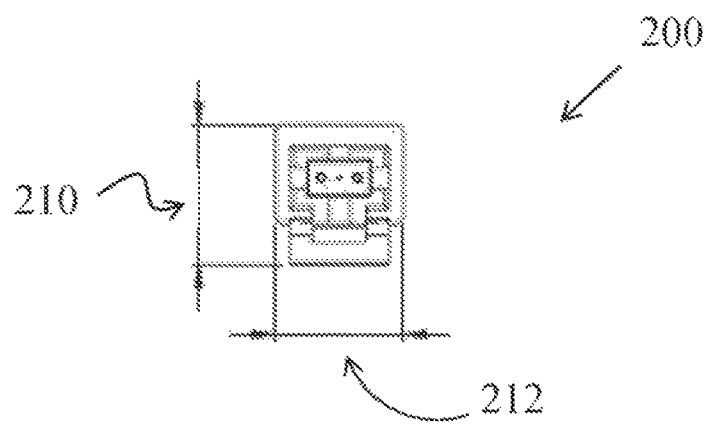
FIG. 2D is a front view of a prior art standard MT-RJ connector.
Figure 2E:
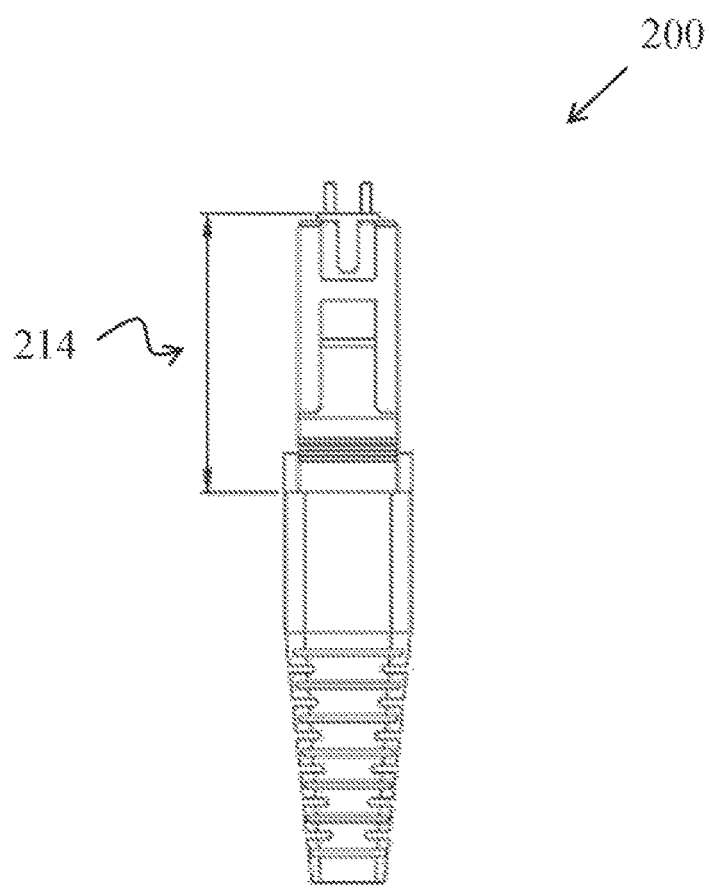
FIG. 2E is a top view of a prior art standard MT-RJ connector.

In another instance, as shown in FIG. 2A, a conventional MT-RJ connector 200 is configured for cable with a smaller number of fiber ribbons, such as 1 to 4 fibers, but it is larger than what is needed for 2-fiber applications. The MT-RJ connector 200 is mounted with a male MT-RJ ferrule 202 as shown in FIG. 2B or a female MT-RJ ferrule 204 as shown in FIG. 2C, and the MT-RJ ferrules have a frontal contact surface height 206 of about 2.5 mm and a frontal contact surface width 208 of about 4.4 mm. FIG. 2D shows a front view of the conventional MT-RJ connector 200 with a height 210 of about 10 mm and a width 212 of about 9.2 mm, and FIG. 2E shows a side view of the conventional MT-RJ connector 200 with a length 214 of about 20 mm.

Figure 3A:
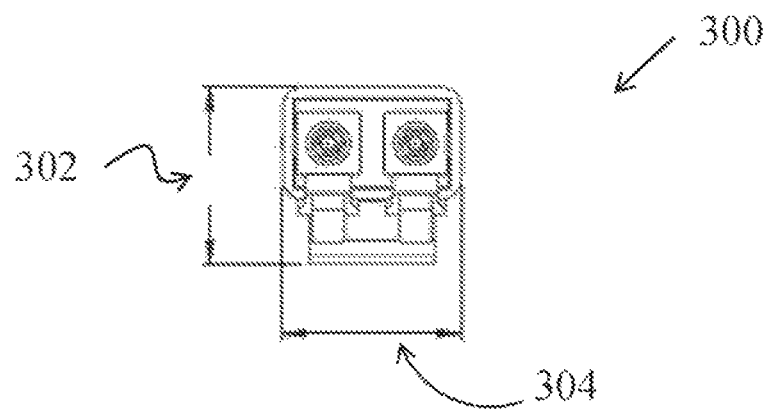
FIG. 3A is a front view of a prior art standard LC duplex connector.
Figure 3B:
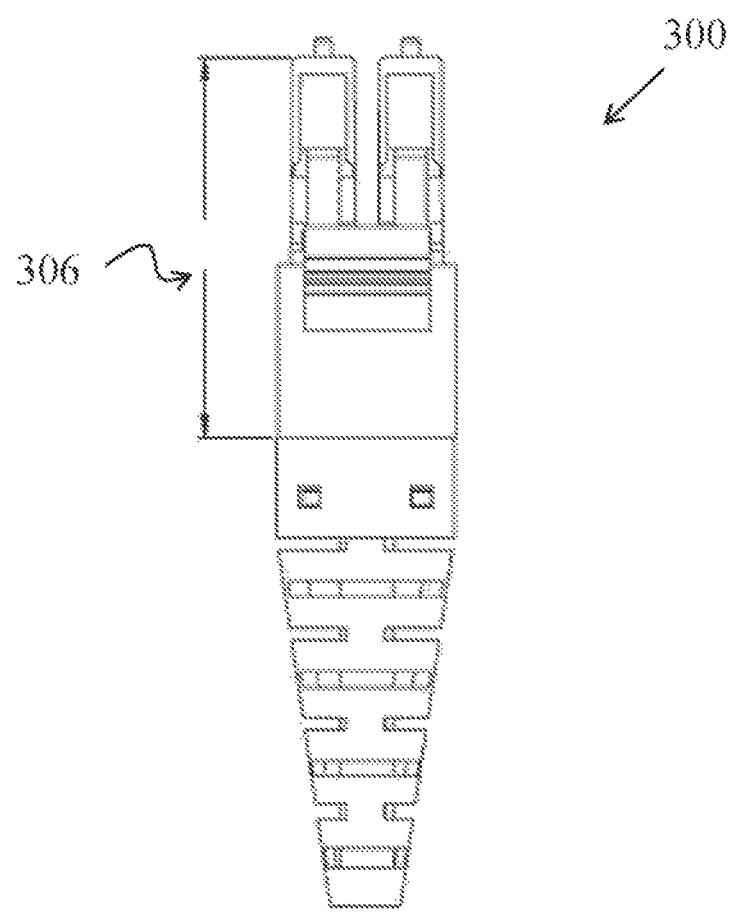
FIG. 3B is a top view of a prior art standard LC duplex connector.

In another instance, as shown in FIG. 3A, a conventional LC duplex connector 300 is designed for 2-fiber applications but its overall dimension is not optimized to address the requirements of high-density network panels. The LC duplex connector 300 has a height 302 of about 12.7 mm and a width 304 of about 12.8 nun. FIG. 3B shows a side view of the conventional LC duplex connector 300 with a length 306 of about 27.3 mm.

Figure 4A:
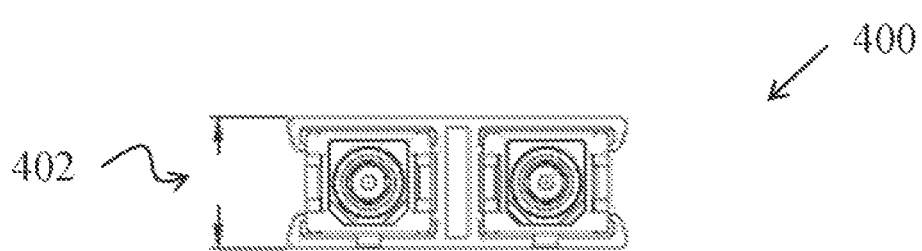
FIG. 4A is a front view of a prior art standard SC duplex connector.
Figure 4B:
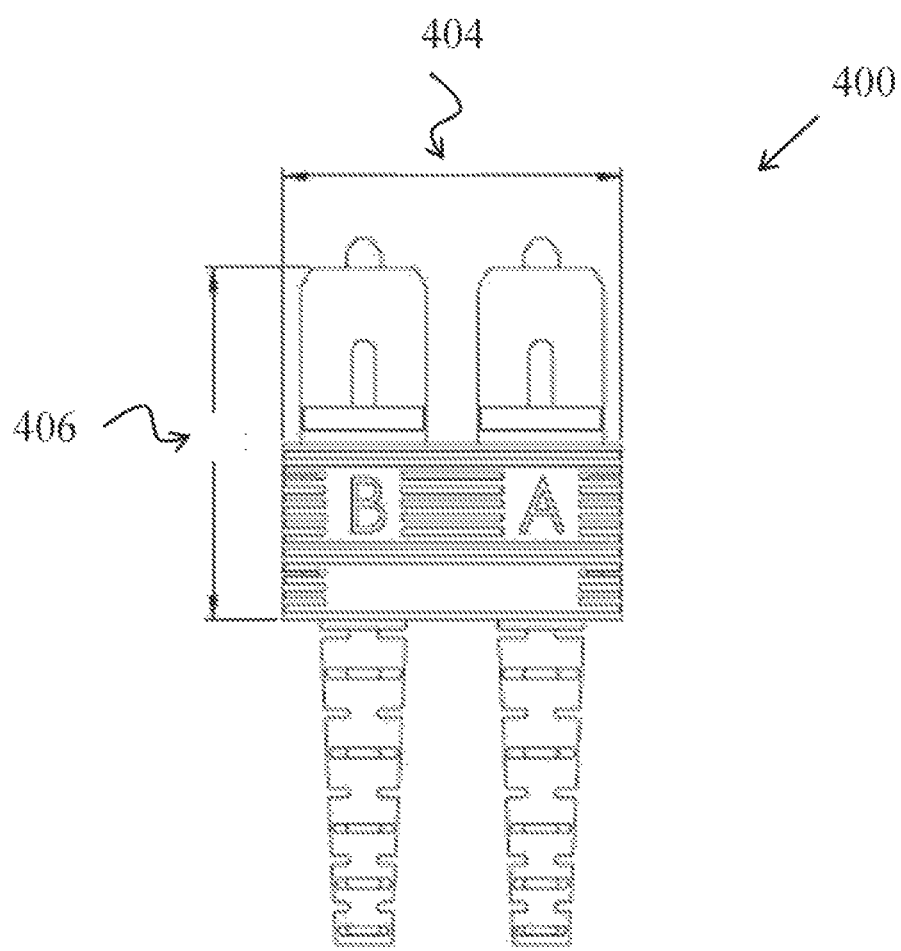
FIG. 4B is a top view of a prior art standard SC duplex connector.

In another instance, as shown in FIG. 4A, a conventional SC duplex connector 400 is designed for 2-fiber applications, similar to the LC duplex connector 300, but its overall dimension is not optimized to address the requirements of high-density network panels. The SC duplex connector 400 has a height 402 of about 9.3 mm. FIG. 48 shows a side view of the conventional SC duplex connector 400 with a width 404 of about 24.2 mm and a length 406 of about 25.2 mm.

Figure 5A:
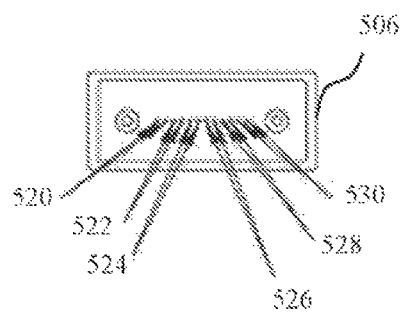
FIG. 5A is a front view of a prior art standard 12-fiber MPO connector.
Figure 5B:
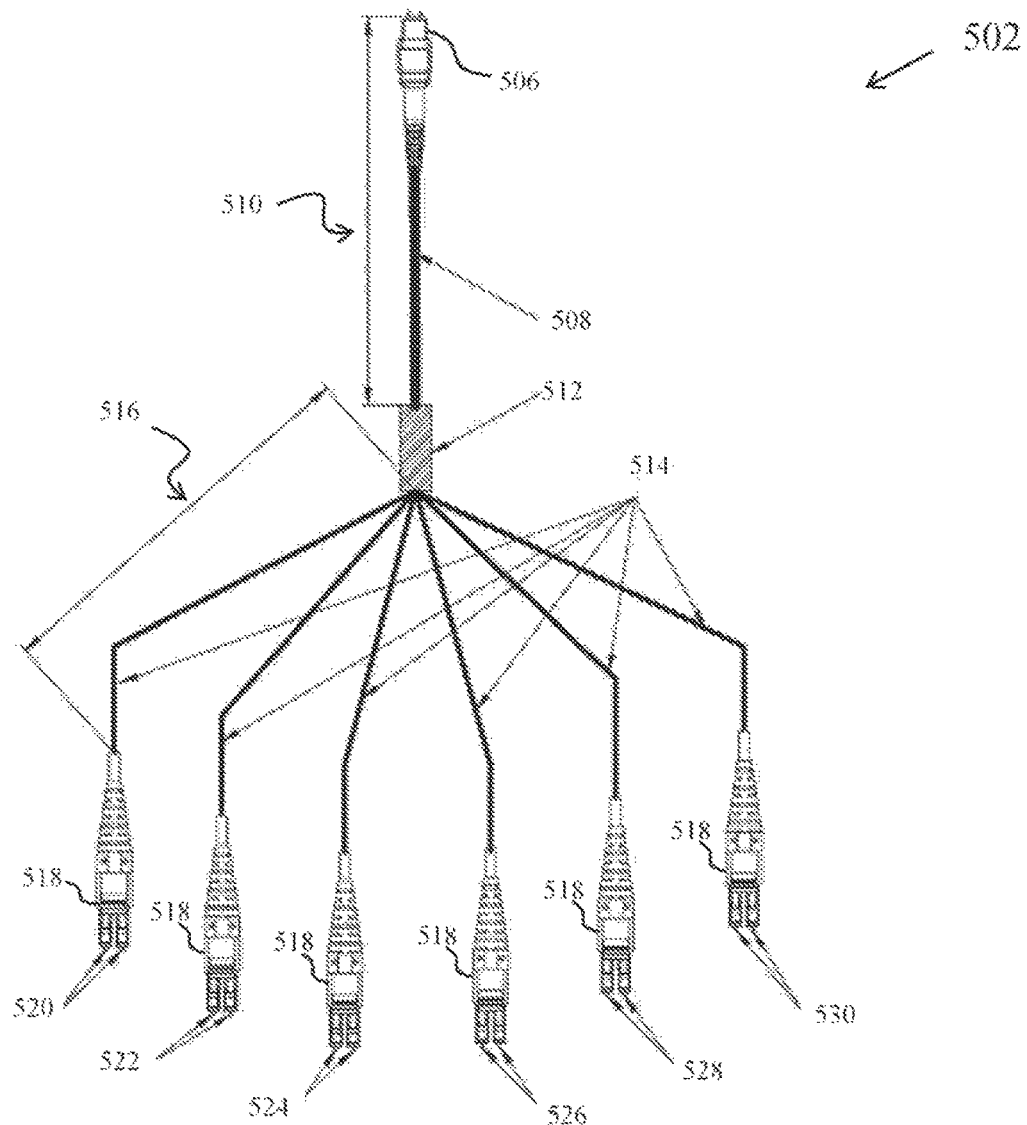
FIG. 5B is a schematic representation of a prior art standard LC duplex fan-out jumper, showing six 2-fiber connectors.

In another example, FIG. 5B shows a plan view of a conventional 12-fiber MPO—6 LC duplex fan-out jumper 502 that is often used to couple with a high-density network panel, and FIG. 5A shows a front view of a 12-fiber MPO connector 506 that is attached at one end of the 12-fiber MPO-6 LC duplex fan-out jumper 502. The 12-fiber MPO connector 506 comprises six fiber pairs 520, 522, 524, 526, 528, and 530, wherein each pair has one data-transmitting Tx fiber and one data-receiving Rx fiber. The twelve fibers go through a cable 508 and are separated into 2-fiber cables 514 at a fan-out block 512. The 2-fiber cables 514 have a length 516 and are terminated by an LC connector 518 comprising one of the fiber pairs 520, 522, 524, 526, 528, and 530.

Figure 6:
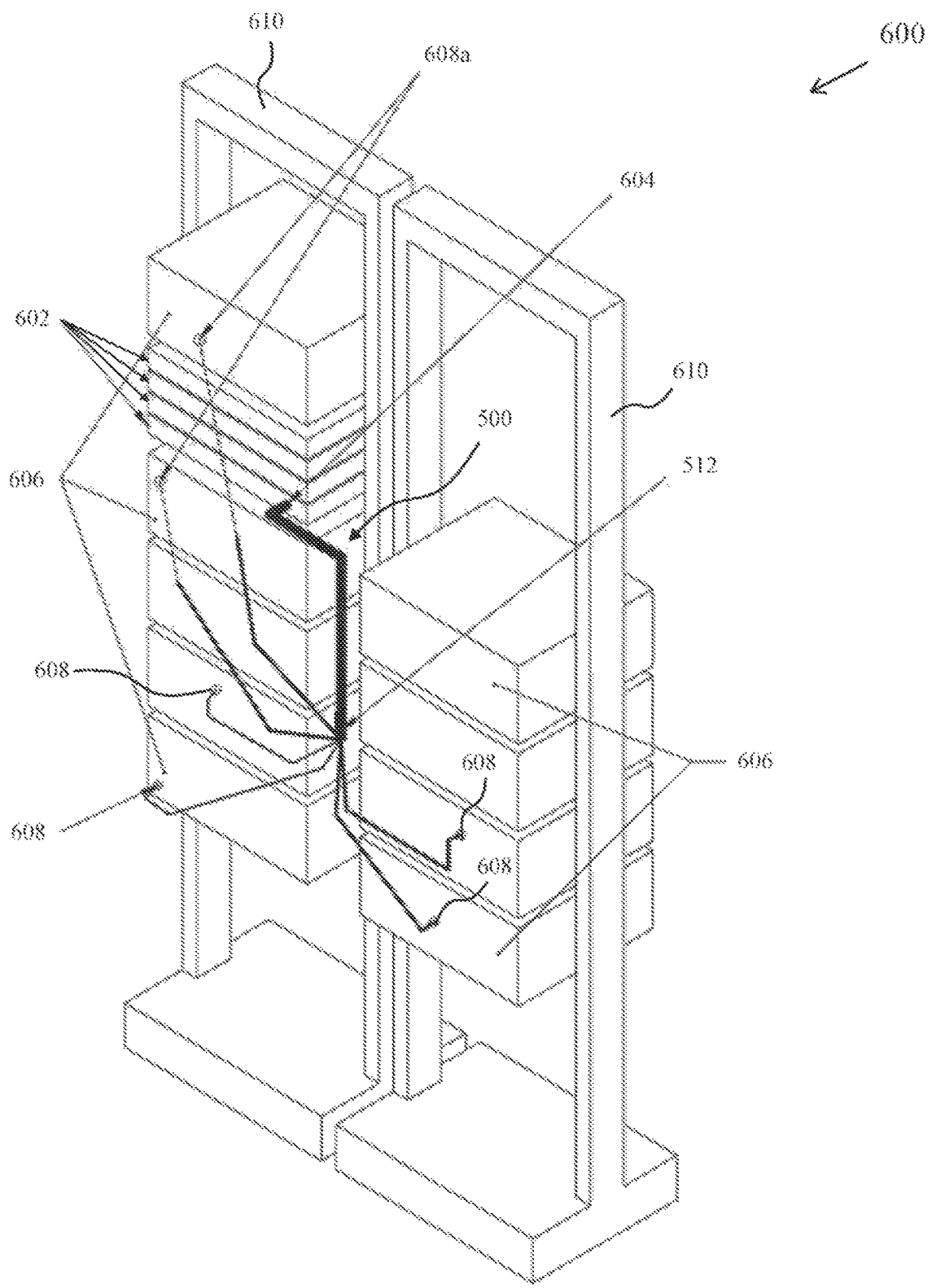
FIG. 6 is a schematic representation of network switch and distribution equipment racks, showing the MPO connector end of a jumper at a transceiver.

FIG. 6 shows a perspective view of the 12-fiber MPO—6 LC duplex fan-out jumper 500 and conventional network equipment racks 600 that can be found, for example, in a central office and data center. The network equipment racks 600 comprise a plurality of network switches 602 comprising a transceiver 604 and a plurality of network panels 606 comprising a plurality of network panel ports 608. The network switches 602 and the network panels 604 are connected through the 12-fiber MPO—6 LC duplex jumper 500. The 12-fiber MPO connector 506 (not shown) located at one end of the 12-fiber MPO—6 LC duplex fan-out jumper 500 connects to the transceiver 604, and only four of the six 2-fiber LC cables 514 located at the other end of the 12-fiber MPO—6 LC duplex fan-out jumper 500 connect to the network panel ports 608. The remaining two 2-fiber LC cables 514 do not connect to the network panel ports since the desired panel ports 608a are not accessible due to the too short length 516 of the 2-fiber cables 514. Therefore, the 12-fiber MPO—6 LC duplex fan-out jumper 500 is not optimized for a high-density network panel having network panel ports located at different distances from the 12-fiber MPO—6 LC duplex fan-out jumper 500.

Various embodiments disclosed herein are configured for use as a mechanical transfer (MT) connector, such as a micro-MT (MMT) connector 700 as shown in FIG. 7A, comprising a male micro-MT ferrule 702 as shown in FIG. 7B or a female micro-MT ferrule 704 as shown in FIG. 7C. The male micro-MT ferrule 702 and the female micro-MT ferrule 704 have a frontal contact surface smaller than that of conventional 2.5 mm high and 7.6 mm wide MPO ferrules and conventional 2.5 mm high and 4.4 mm wide MT-RJ ferrules. In some embodiments, the MT ferrule is a micro-MT ferrule having a contact surface with a height 706 in a range of about 1.0 mm to about 2.4 mm, such as a height of about 2.0 mm or a height of about 1.6 mm. In some embodiments, the MT ferrule is a micro-MT ferrule having a contact surface with a width 708 in a range of about 2.4 mm to about 4.3 mm, such as a width of about 4.0 mm or a width of about 3.6 mm.

Figure 7D:
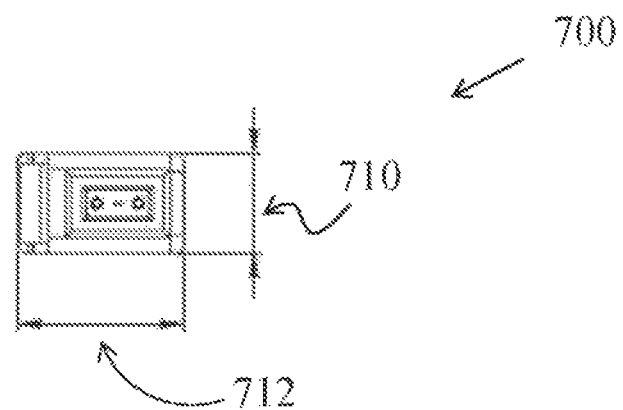
FIG. 7D is a front view of one embodiment of a simplex micro-MT connector according to aspects of the present disclosure.

FIG. 7D shows a front view of a simplex micro-MT connector 700 having a height 710 smaller than that of a conventional 7.6 mm high MPO connector, a conventional 10 mm high MT-RJ connector, a conventional 12.7 mm high LC duplex connector, or a conventional 9.3 mm high SC duplex connector. In some embodiments, the simplex MT connector is a simplex micro-MT connector having a height 710 in a range of about 3.8 mm to about 7.5 mm, such as a height of about 6.5 mm or a height of about 5.5 mm.

The simplex micro-MT connector 700 shown in FIG. 70 has a width 712 smaller than that of a conventional 12.4 mm wide MPO connector, a conventional 9.2 mm wide MT-RJ connector, a conventional 12.8 mm wide LC duplex connector, or a conventional 24.2 mm wide SC duplex connector. In some embodiments, the MT simplex connector is a simplex micro-MT connector having a width 712 in a range of about 6.4 mm to about 9.1 mm, such as a width of about 8.8 mm or a width of about 8.5 mm.

Figure 7E:
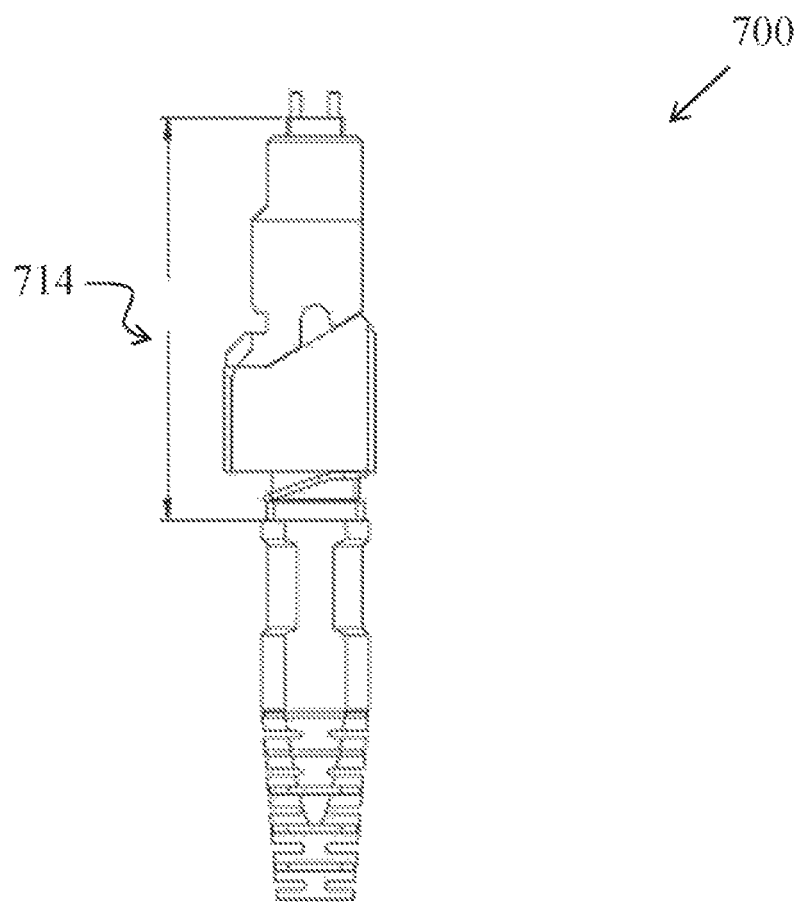
FIG. 7E is a top view of one embodiment of a simplex micro-MT connector according to aspects of the present disclosure.

FIG. 7E shows a side view of the simplex micro-MT connector 700 having a length 714 smaller than that of a conventional 25.7 mm long MPO connector, a conventional 27.3 mm long LC duplex connector, or a conventional 25.2 mm long SC duplex connector. In some embodiments, the simplex MT connector is a simplex micro-MT connector having a length 714 in a range of about 17.0 mm to about 25.1 mm, such as a length of about 23.2 mm or a length of about 21.3 mm.

Figure 7F:
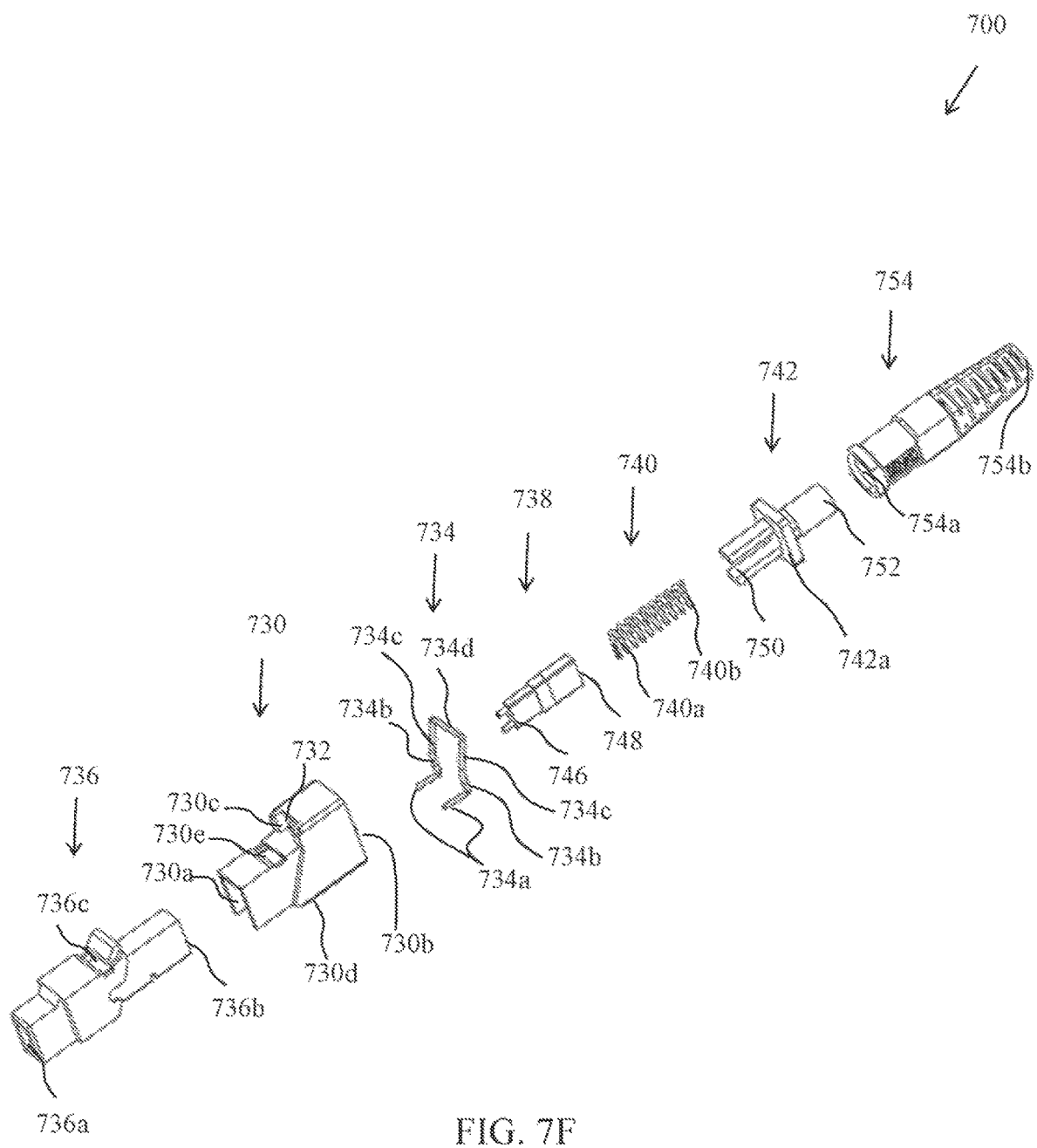
FIG. 7F is an exploded view of one embodiment of a simplex micro-MT connector according to aspects of the present disclosure.

FIG. 7F shows one embodiment of the simplex micro-MT connector 700 according to aspects disclosed herein. The simplex micro-MT connector 700 may include a housing 736 defining a longitudinal passage therethrough from a proximal end 736a to a distal end 736b and including a latch hole 736c designed to couple with a latch arm (not shown) from an adaptor (not shown).

The simplex micro-MT connector 700 may include a latch body 730 defining a first longitudinal passage therethrough from a proximal end 730a to a distal end 730b, a second longitudinal passage therethrough from a middle 730c to the distal end 730b. The latch body 730 comprises a bottom 730d, a hook hole 732 to couple with a pull-tab (not shown), and a latch hole 730e to couple with a latch arm (not shown) from an adaptor (not shown). The latch body is movably coupled with the housing 736 wherein at least part of the housing is movably within at least the first longitudinal passage of the latch body 730.

The simplex micro-MT connector 700 may comprise a latch spring 734 defining a longitudinal passage therethrough and comprising arms 734*a*, lower parts 734*b*, and upper parts 734*c*, and a top part 734*d*. The latch spring is coupled with the distant end 730*b* and the bottom 730*d* of the latch body 730. The latch spring is movably coupled with the housing 736 wherein at least part of the housing is movably within the longitudinal passage of the latch spring 734.

The simplex micro-MT connector 700 may comprise a ferrule 738 extending longitudinally from a proximal end 746 to a distal end 748 and disposed at least partially within the longitudinal passage of the housing 736 with the proximal end protruding externally through the passage defined by the latch body 730 and the housing.

The simplex micro-MT connector 700 may comprise a ferrule spring 740 defining a longitudinal and movable passage therethrough from a proximal end 740*a* to a distal end 740*b*. The ferrule spring 740 is at least partially within the longitudinal passage of the housing 736.

The simplex micro-MT connector 700 may comprise a spring push 742 defining a longitudinal passage therethrough from a proximal end 750 to a distal end 752 and comprising a flange 742*a*. The spring push 742 is at least partially within the housing 736.

The simplex micro-MT connector 700 may comprise a cable boot 754 defining a longitudinal passage therethrough from a proximal end 754*a* to a distal end 754*b*. The proximal end 754*a* of the cable boot 754 is coupled with the distal end 752 of the spring push 742.

Figure 8A:
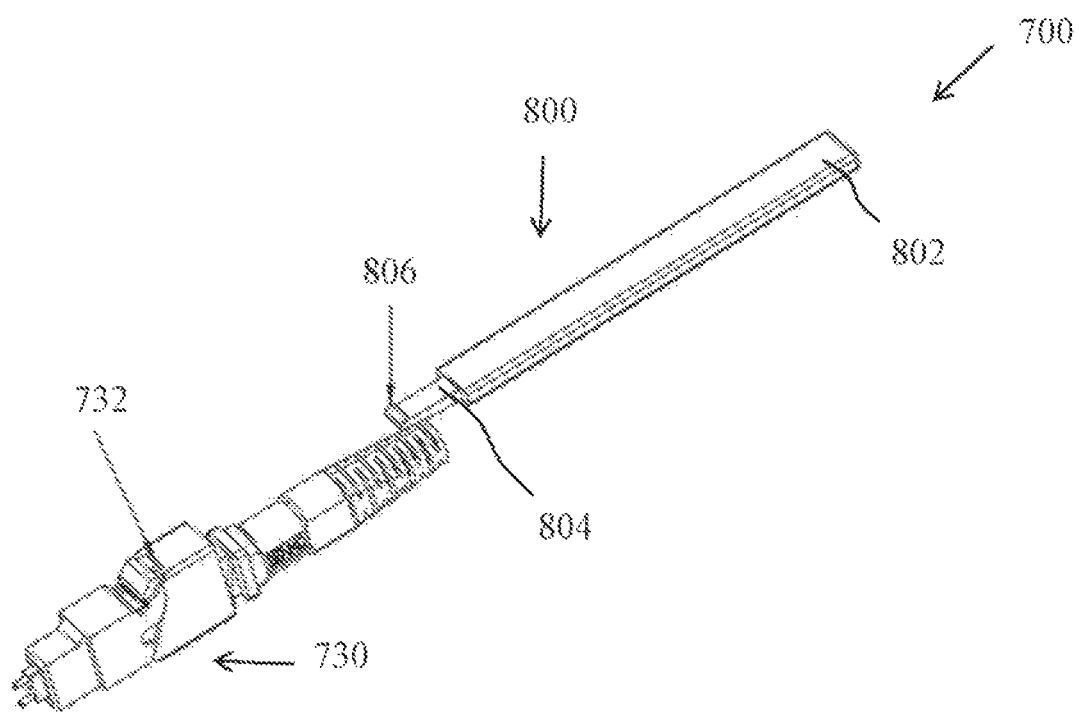
FIG. 8A is a perspective view of one embodiment of a simplex micro-MT connector according to aspects of the present disclosure, showing a pull-tab.
Figure 8B:
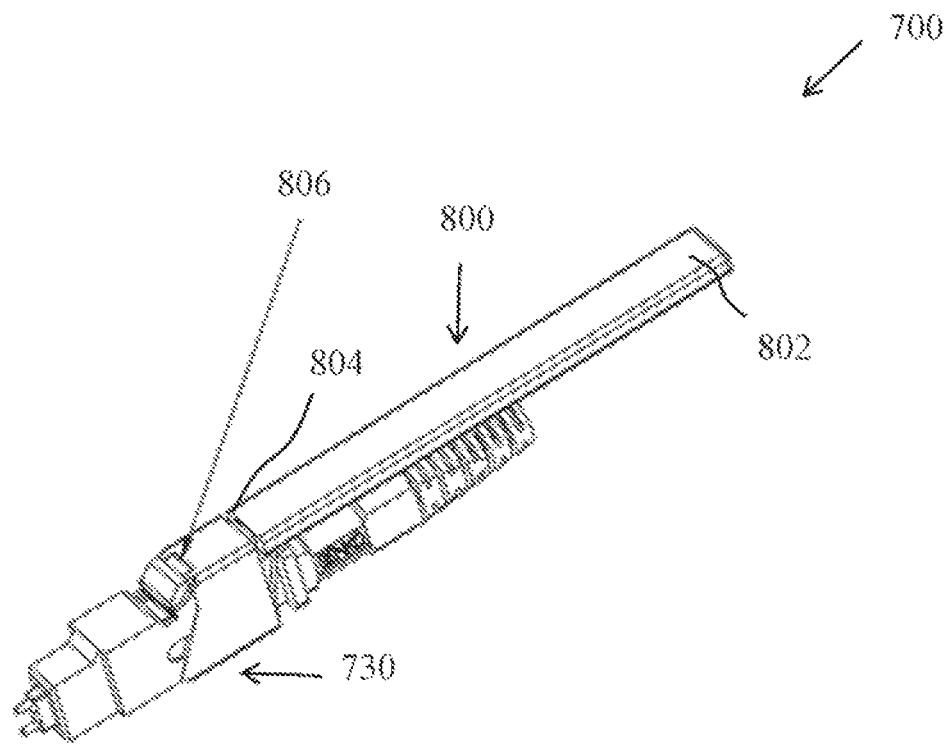
FIG. 8B is a perspective view of one embodiment of a simplex micro-MT connector according to aspects of the present disclosure, showing the pull-tab of FIG. BA engaged in a hook hole.

As shown in FIG. 8A, the simplex micro-MT connector 700 may comprise a pull-tab 800 having a distal end 802 and a proximal end 804. The proximal end 804 may include a latch hook 806 uniquely shaped so as to engage with the unique profile of the latch body 730 that is integral to the simplex micro-MT connector 700. As shown in FIG. 8B, the proximal end 804 is disposed within the second longitudinal passage of the latch body 730. The pull-tab hook 806 snaps with the hook hole 732 so that the pull-tab 800 is coupled to the simplex micro-MT connector 700. The pull-tab 800 can be removably coupled to the simplex micro-MT connector 700. The pull-tab 800 may be coupled to the simplex micro-MT connector 700 by means other than by snapping into position, such as sliding or hooking into position. The pull-tab 800 may alternatively be an integral component of the simplex micro-MT connector 700.

Figure 9A:
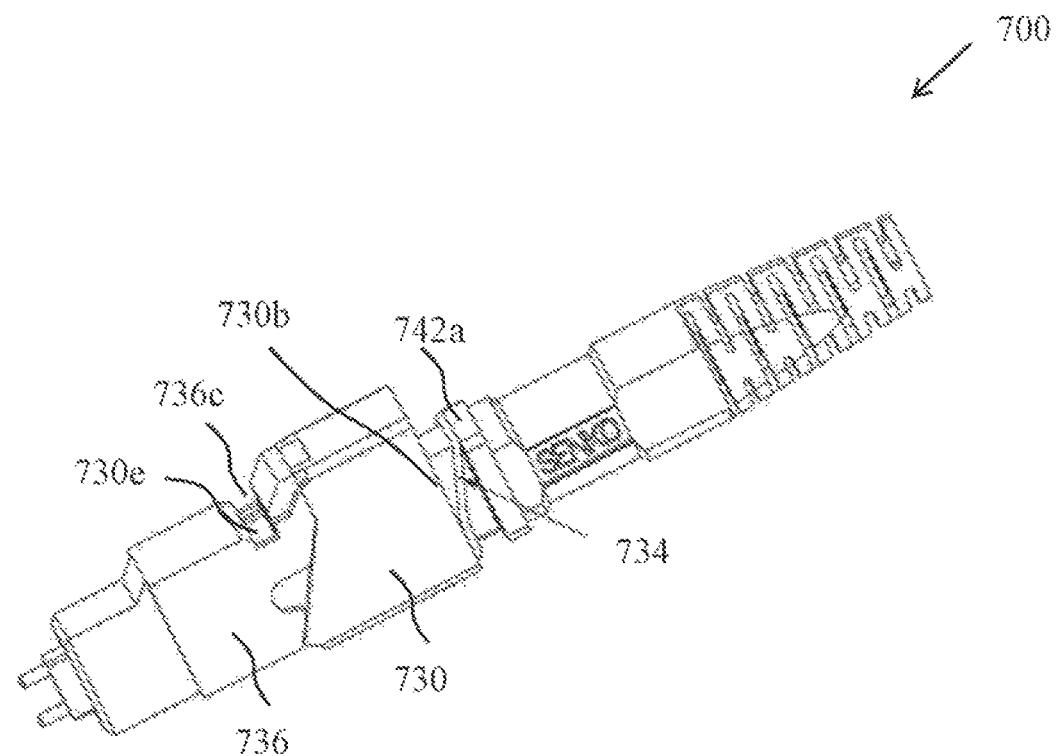
FIG. 9A is a perspective view of one embodiment of a simplex micro-MT connector according to aspects of the present disclosure, showing a relaxed latch spring.

FIG. 9A shows the configuration of the simplex micro-MT connector 700 when it is coupled with an adaptor (not shown). In this configuration, the latch spring 734 is not compressed and therefore not actuated. The lower part 734*b* of the latch spring 734 is in contact with the latch body 730 distal end 730*b*, and the top part 734*d* of the latch spring 734 is in contact with the flange 742*a* from the spring push 742. Most importantly, in this configuration, the latch hole 736*c* from the housing 736 and the latch hole 730*e* from the latch body 730 are disposed vertically, one above each other, to generate a large cavity where a latch from an adaptor can couple to fasten the connector to the adaptor.

Figure 9B:
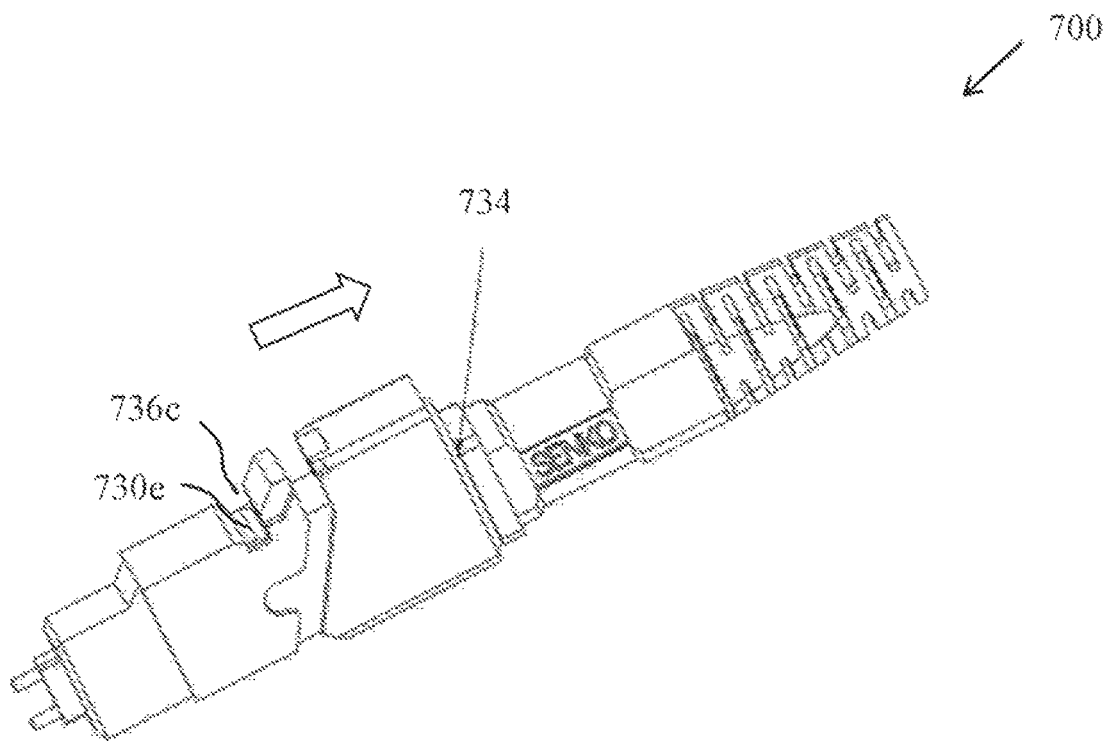
FIG. 9B is a perspective view of one embodiment of a simplex micro-MT connector according to aspects of the present disclosure, showing a compressed latch spring.

FIG. 9B shows the configuration of the simplex micro-MT connector 700 when it is not coupled with an adaptor (not shown). In this configuration, the latch spring 734 is compressed and therefore actuated. The latch body 730 is pulled back manually or by the pull-tab 800 (not shown) toward the distal end of the housing 736 and compresses the latch spring 734 so its lower part 734*b*, middle part 734*c* and top 734*d* are in contact with both the distal end 730*b* of the latch body 730 and the flange 742*a* of the push spring 742. In this configuration, the latch hole 736*c* from the housing 736 and the latch hole 730*e* from the latch body 730 are not disposed vertically, one above each other, and do not generate a large enough cavity where a latch from the adaptor can couple to fasten the connector to the adaptor micro-MT duplex connector.

Figure 10A:
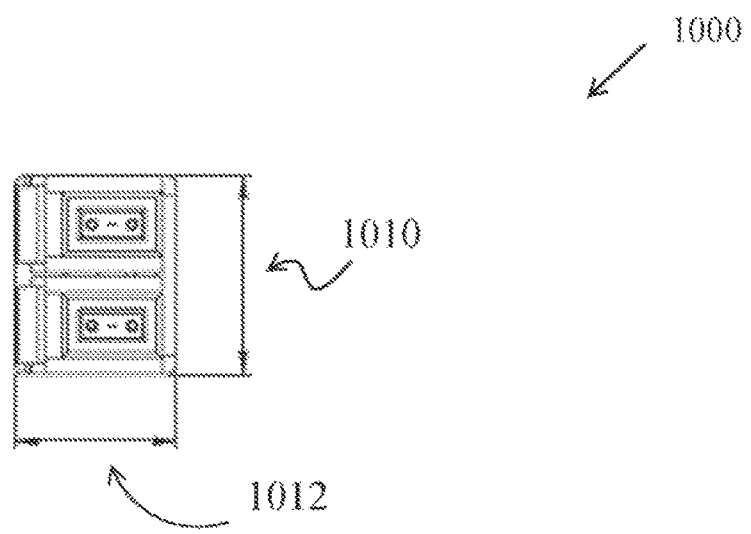
FIG. 10A is a front view of one embodiment of a duplex micro-MT connector according to aspects of the present disclosure.

Various embodiments disclosed herein are configured for use as a mechanical transfer (MT) connector, such as a duplex micro-MT (MMT) connector 1000 as shown in FIG. 10A. In some embodiments, the duplex micro-MT connector 1000 has a height 1010 in a range of about 7.8 mm to about 13.8 mm, such as a height of about 12.8 mm or a height of about 11.8 mm. In some embodiments, the duplex micro-MT connector 1000 has a width 1012 in a range of about 6.4 mm to about 9.1 mm, such as a width of about 8.8 mm or a width of about 8.5 mm.

Figure 10B:
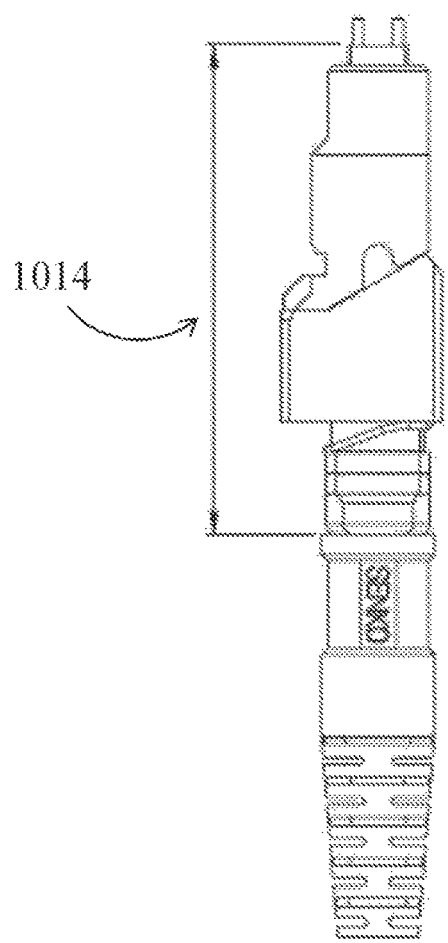
FIG. 10B is a top view of one embodiment of a duplex micro-MT connector according to aspects of the present disclosure.

FIG. 10B shows a side view of the duplex micro-MT connector 1000. In some embodiments, the duplex micro-MT connector 1000 has a length 1014 in a range of about 19.4 mm to about 29.0 mm, such as a length of about 27.0 mm or a length of about 25.0 mm.

Figure 10C:
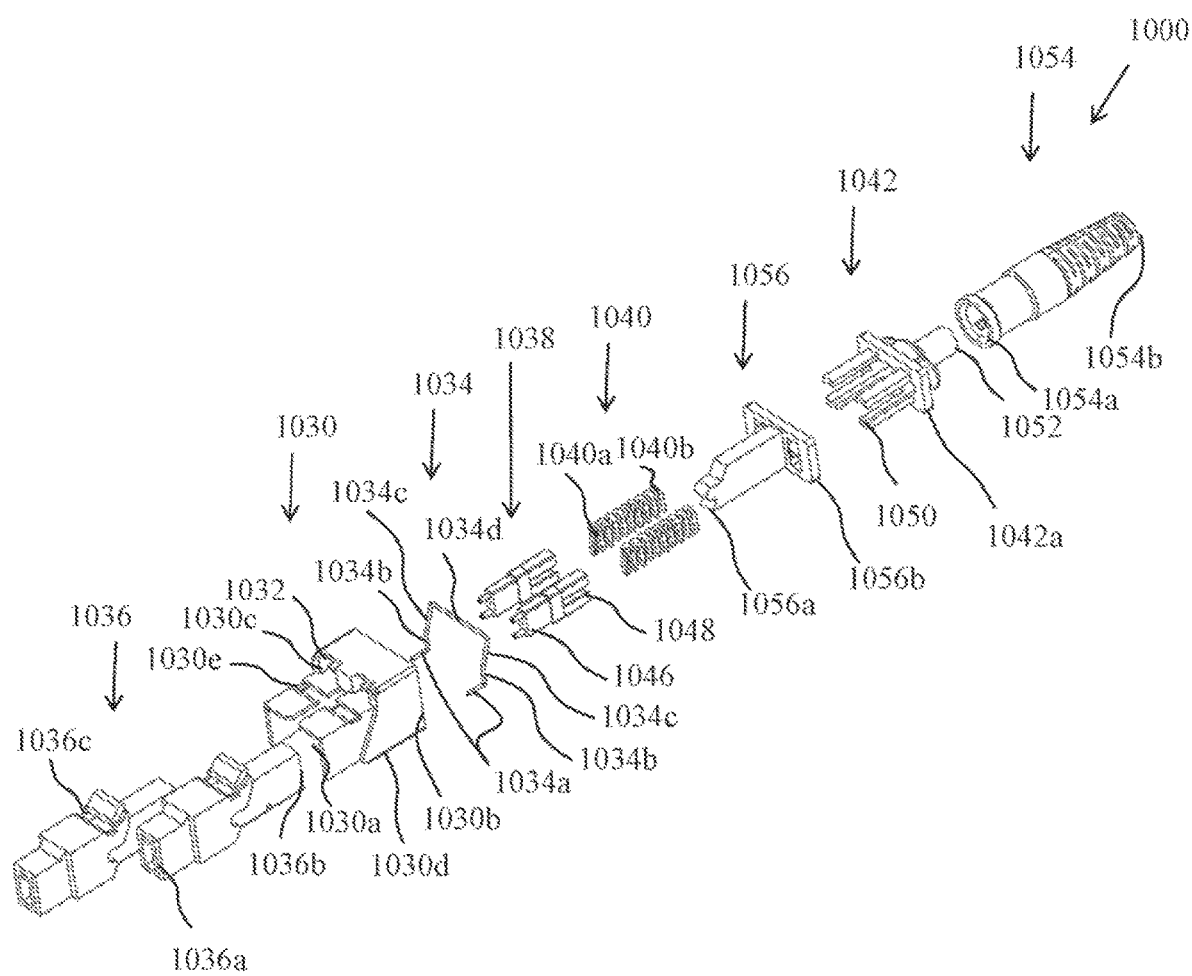
FIG. 10C is an exploded view of one embodiment of a duplex micro-MT connector according to aspects of the present disclosure.

FIG. 10C shows one embodiment of the duplex micro-MT connector 1000 according to aspects disclosed herein. The duplex micro-MT connector 1000 may include a first housing and a second housing 1036 each defining a longitudinal passage therethrough from a proximal end 1036*a* to a distal end 1036*b* and including a latch hole 1036*c* designed to couple with a latch arm (not shown) from an adaptor (not shown).

The duplex micro-MT connector 1000 may include a latch body 1030 defining a first longitudinal passage therethrough from a proximal end 1030*a* to a distal end 1030*b*, a second longitudinal passage therethrough from a middle 1030*c* to the distal end 1030*b*. The latch body 1030 comprises a bottom 1030*d*, two hook holes 1032 to couple with a pull-tab (not shown), and two latch holes 1030*e* to couple with a latch arm (not shown) from an adaptor (not shown). The latch body 1030 is movably coupled with the housings 1036 wherein at least part of the housing is movably within at least the first longitudinal passage of the latch body 1030.

The duplex era-MT connector 1000 may comprise a latch spring 1034 defining a longitudinal passage therethrough and comprising arms lower parts 1034*b*, upper parts 1034*c*, and a top part 1034*d*. The latch spring 1034 is coupled with the distal end 1030*b* and the bottom 1030*d* of the latch body 1030. The latch is movably coupled with the housings 1036 wherein at least part of the housings is movably within the longitudinal passage of the latch spring 1034.

The duplex micro-MT connector 1000 may comprise two ferrules 1038 each extending longitudinally from a proximal end 1046 to a distal end 1048 and disposed at least partially within the longitudinal passage of one of the housings 1036 with the proximal end 1046 protruding externally to the passage.

The duplex micro-MT connector 1000 may comprise two ferrule springs 1040 defining a longitudinal and movable passage therethrough from a proximal end 1040*a* to a distal end 1040*b*. The ferrule springs 1040 are at least partially within a longitudinal passage of the housing 1036.

The duplex micro-MT connector 1000 may comprise a spring separator 1056 defining two longitudinal passages therethrough and comprising an elongated part extending from a proximal end 1056*a* to a distal end 1056*b*.

The duplex micro-MT connector 1000 may comprise a spring push 1042 defining a longitudinal passage therethrough from a proximal end 1050 to a distal end 1052 and comprising a flange 1042a. The spring push 1042 is at least partially within the housing 1036.

The duplex micro-MT connector 1000 may comprise a cable boot 1054 defining a longitudinal passage therethrough from a proximal end 1054a to a distal end 1054b. The proximal end 1054a of the cable boot 1054 is coupled with the distal end 1052 of the spring push 1042.

Figure 11A:
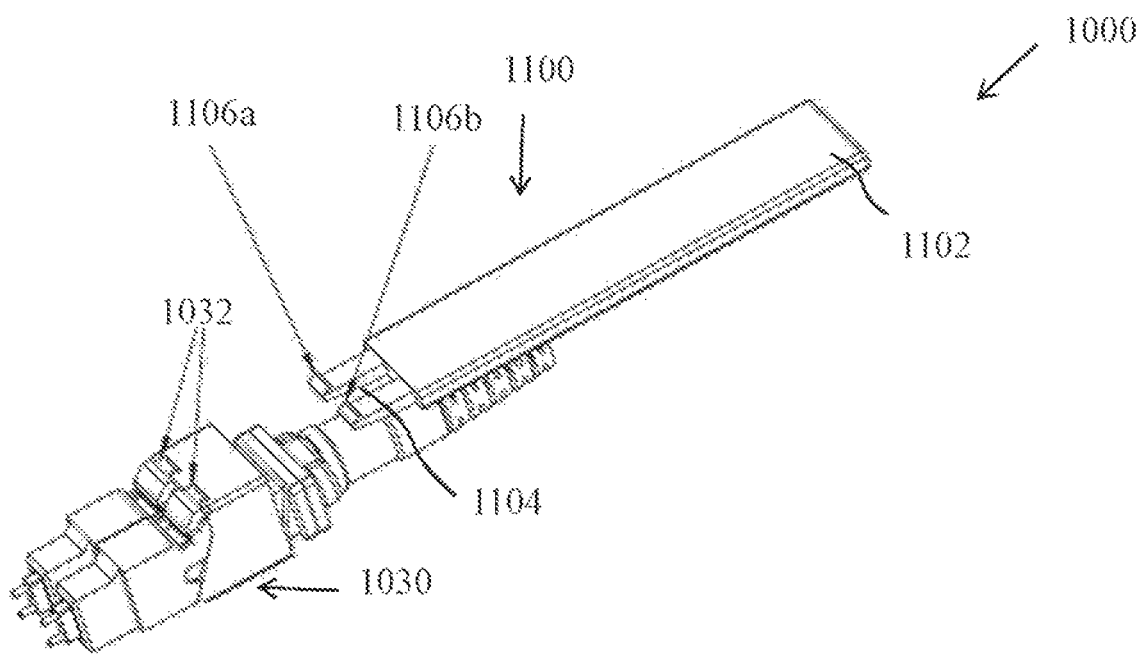
FIG. 11A is a perspective view of one embodiment of a duplex micro-MT connector according to aspects of the present disclosure, showing a pull-tab.
Figure 11B:
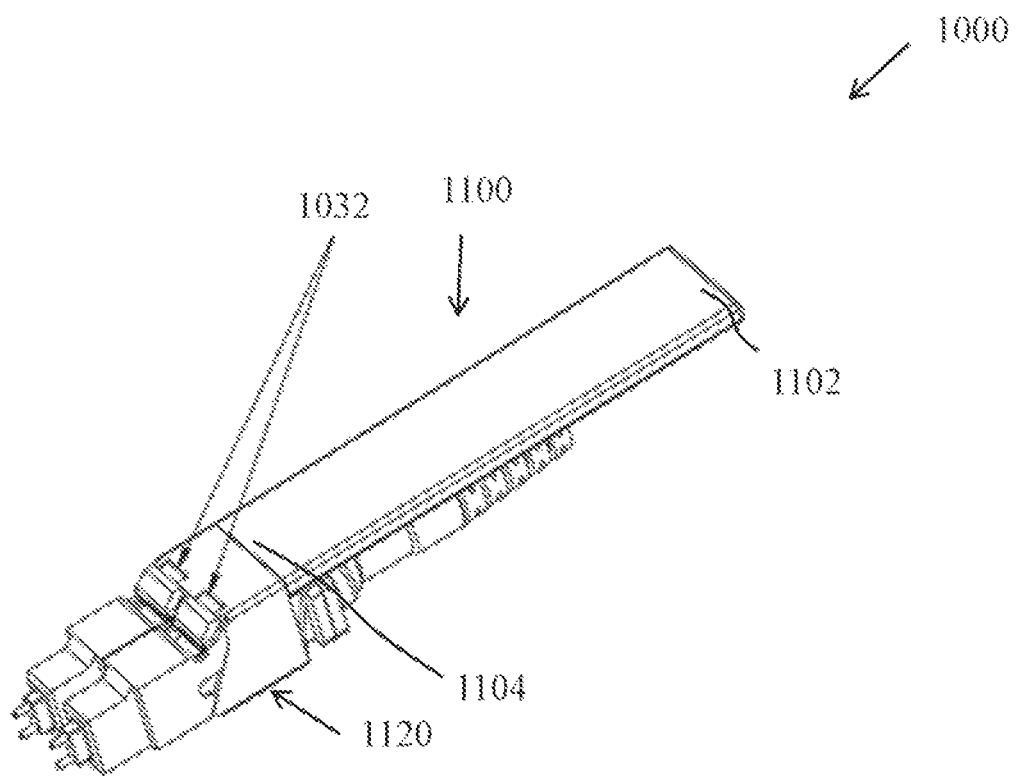
FIG. 11B is a perspective view of one embodiment of a duplex micro-MT connector according to aspects of the present disclosure, showing the pull-tab of FIG. 11A engaged in a hook hole.

As shown in FIG. 11A, the duplex micro-MT connector 1000 may comprise a pull-tab 1100 having a distal end 1102 and a proximal end 1104. The proximal end 1104 may include two latch hooks 1106a and 1106b uniquely shaped so as to engage with the unique profile of latch body 1030 from the duplex micro-MT connector 1000. As shown in FIG. 11B, proximal end 1104 is disposed within the second longitudinal passage of the latch body 1030. The pull-tab hooks 1106a and 1106b then snaps with the hook holes 1032 so that the pull-tab 1100 is coupled to the duplex micro-MT connector 1000.

Figure 12A:
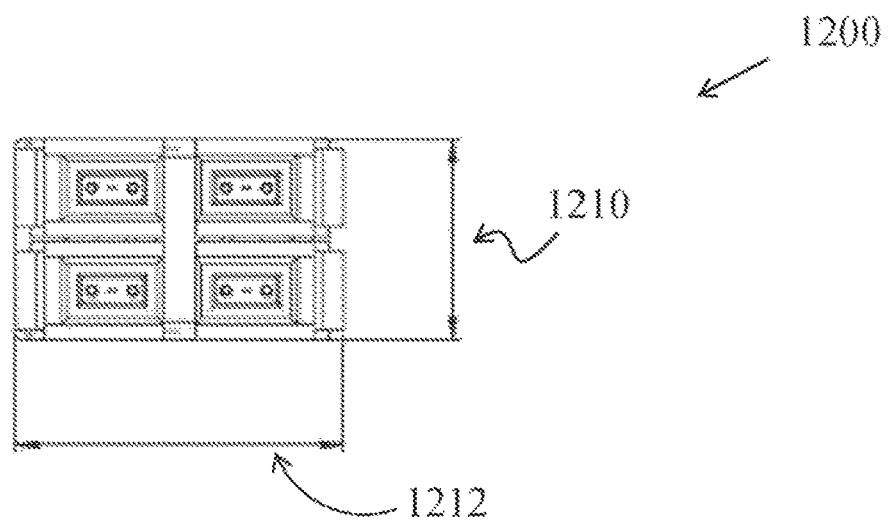
FIG. 12A is a front view of one embodiment of a quad micro-MT connector according to aspects of the present disclosure.

Various embodiments disclosed herein are configured for use as a mechanical transfer (MT) connector, such as a quad micro-MT (MMT) connector 1200 as shown in FIG. 12A. In some embodiments, the quad micro-MT connector 1200 has a height 1210 in a range of about 7.8 mm to about 13.8 mm, or such as a height of about 7.8 mm to about 12.8 mm or a height of about 7.8 mm to about 11.8 mm. In some embodiments, the quad micro-MT connector 1200 has a width 1212 in a range of about 12.8 mm to about 21.2 mm, such as a width of about 20.2 mm or a width of about 19.2 mm.

Figure 12B:
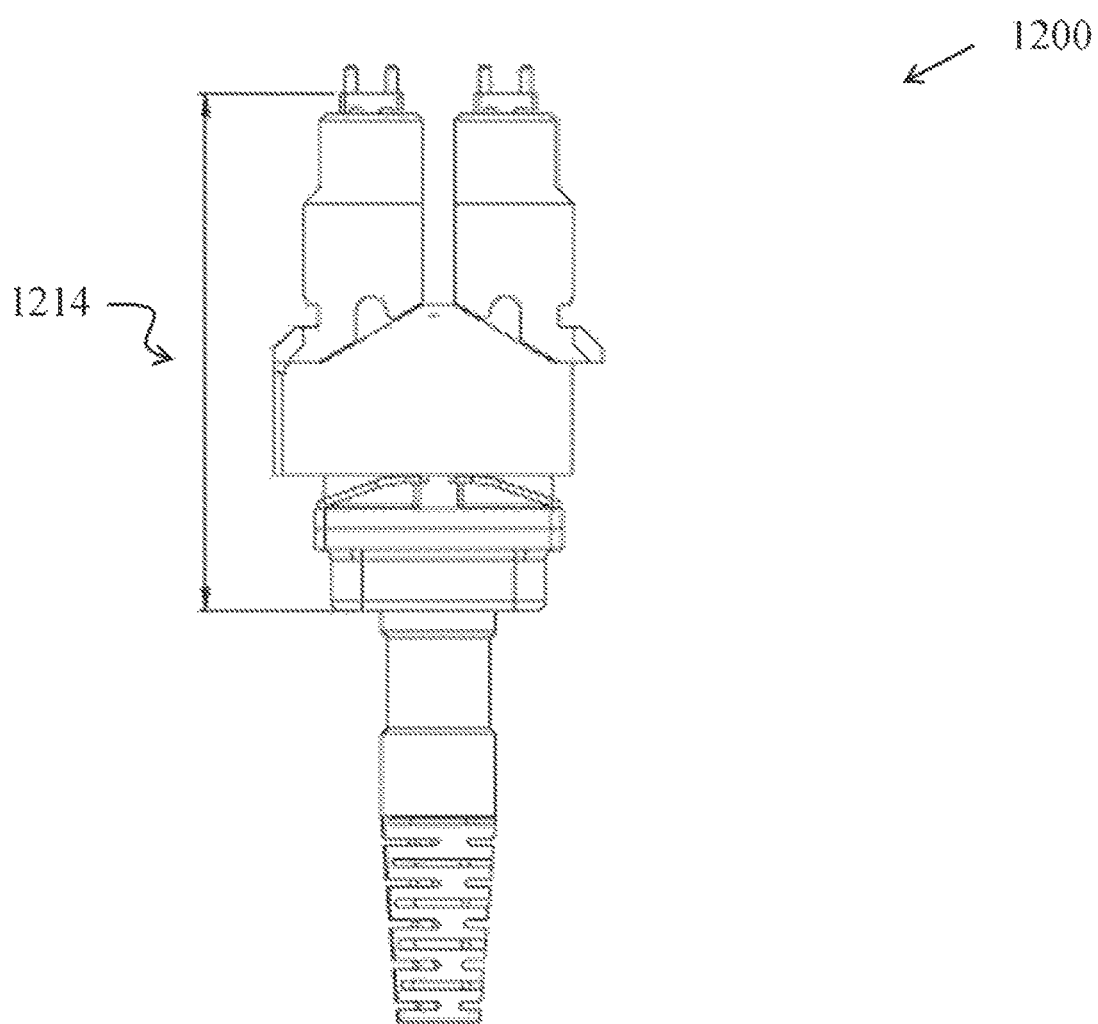
FIG. 12B is a top view of one embodiment of a quad micro-MT connector according to aspects of the present disclosure.

FIG. 12B shows a side view of the quad micro-MT connector 1200. In some embodiments, the quad micro-MT connector 1200 has a length 1214 in a range of about 20.2 mm to about 32.0 mm, such as a length of about 31.0 mm or a length of about 30.0 mm.

Figure 12C:
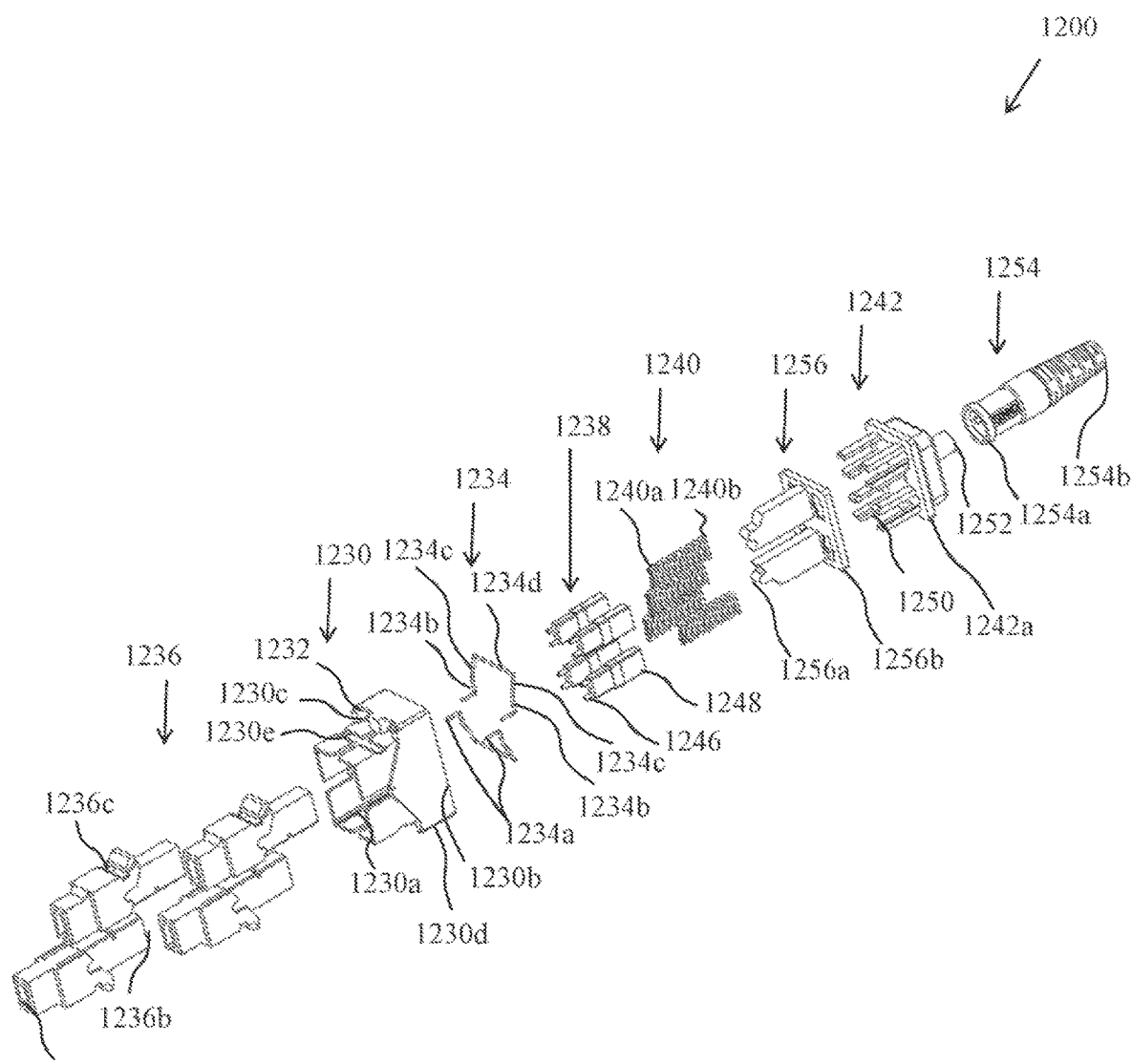
FIG. 12C is an exploded view of one embodiment of a quad micro-MT connector according to aspects of the present disclosure.

FIG. 12C shows one embodiment of quad micro-MT connector 1200 according to aspects disclosed herein. The quad micro-MT connector 1200 may include four housings 1236 each defining a longitudinal passage therethrough from a proximal end 1236a to a distal end 1236b and including a latch hole 1236c designed to couple with a latch arm (not shown) from an adaptor (not shown).

The quad micro-MT connector 1200 may include a latch body 1230 defining a first longitudinal passage therethrough from a proximal end 1230a to a distal end 1230b, a second longitudinal passage therethrough from a middle 1230c to the distal end 1230b. The latch body 1230 comprises a bottom 1230d, two hook holes 1232 to couple with a pull-tab (not shown), and four latch holes 1230e to couple with a latch arm (not shown) from an adaptor (not shown). The latch body is movably coupled with the housings 1236 wherein at least part of the housings is movably within at least the first longitudinal passage of the latch body.

The quad micro-MT connector 1200 may comprise two latch springs 1234 each defining a longitudinal passage therethrough and comprising arms 1234a, lower parts 1234b, upper parts 1234c, and a top part 1234d. The latch springs are coupled with the distant end 1230b of the latch body 1230. The latch springs are movably coupled with the housings 1236 wherein at least part of the housings is movably within the longitudinal passage of the latch springs 1234.

The quad micro-MT connector 1200 may comprise four ferrules 1238 each extending longitudinally from a proximal end 1246 to a distal end 1248 and disposed at least partially within the longitudinal passage of one housing 1236 with the proximal end 1246 protruding externally to the passage.

The quad micro-MT connector 1200 may comprise four ferrule springs 1240 defining a longitudinal and movable passage therethrough from a proximal end 1240a to a distal end 1240b. The ferrule springs 1240 are at least partially within the longitudinal passage of housings 1236.

The quad micro-MT connector 1200 may comprise a spring separator 1256 defining four longitudinal passages therethrough and comprising two elongated parts extending from a proximal end 1256a to a distal end 1256b.

The quad micro-MT connector 1200 may comprise a spring push 1242 defining a longitudinal passage therethrough from a proximal end 1250 to a distal end 1252 and comprising a flange 1242a. The spring push 1242 is at least partially within the housing 1236.

The quad micro-MT connector 1200 may comprise a cable boot 1254 defining a longitudinal passage therethrough from a proximal end 1254a to a distal end 1254b. The proximal end 1254a of the cable boot 1254 is coupled with the distal end 1252 of the spring push 1242.

Figure 13A:
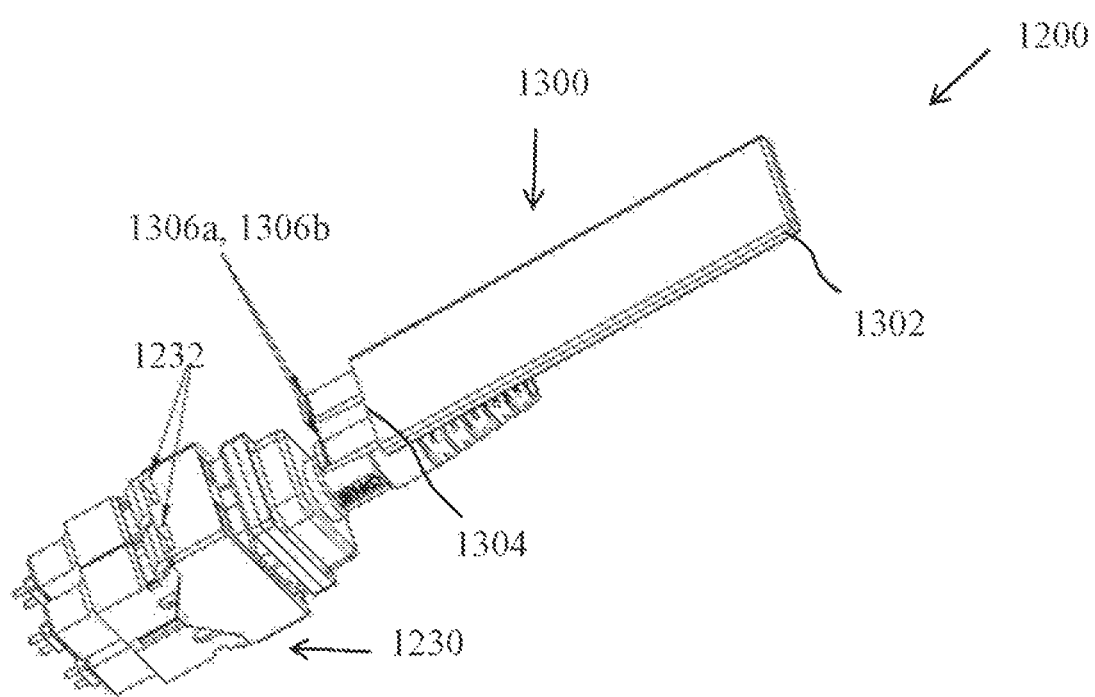
FIG. 13A is a perspective view of one embodiment of a quad micro-MT connector according to aspects of the present disclosure, showing a pull-tab.
Figure 13B:
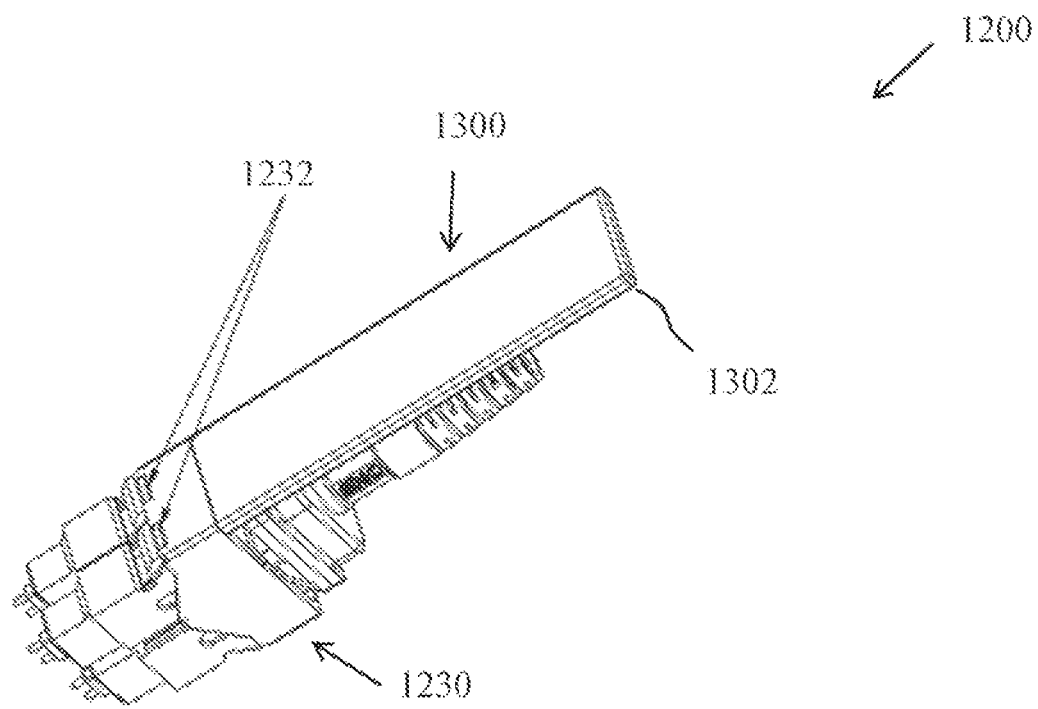
FIG. 13B is a perspective view of one embodiment of a quad micro-MT connector according to aspects of the present disclosure, showing the pull-tab of FIG. 13A engaged in a latch hook.

As shown in FIG. 13A, the quad micro-MT connector 1200 may comprise a pull-tab 1300 having a distal end 1302 and a proximal end 1304. The proximal end 1304 may include two latch hooks 1306a and 1306b uniquely shaped so as to engage with the unique profile of latch body 1230 from the quad micro-MT connector 1200. As shown in FIG. 13B, proximal end is disposed within the second longitudinal passage of the latch body 1230. The pull-tab hooks 1306a and 1306b then snap with the hook holes 1232 so that the pull-tab 1300 is coupled to the quad micro-MT connector 1200.

Figures 14A, 14B:
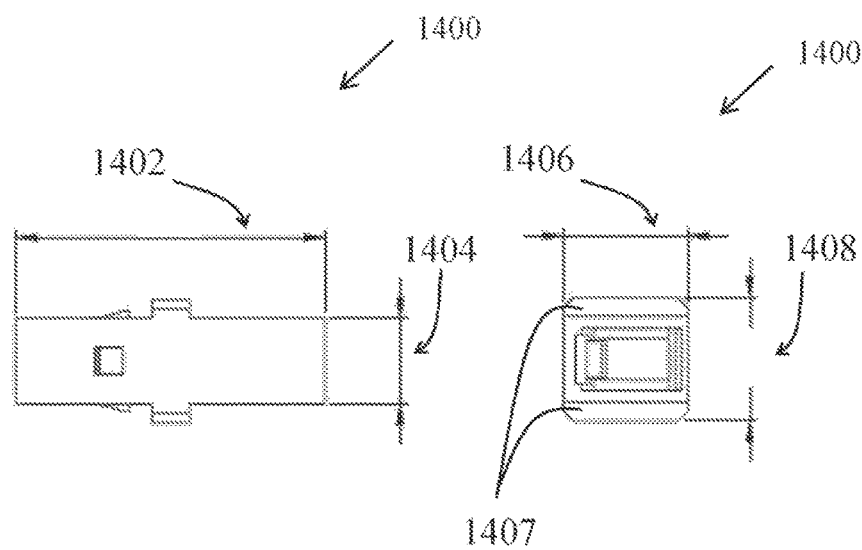
FIG. 14A is a top view of one embodiment of a simplex micro-MT adapter according to aspects of the present disclosure.
FIG. 14B is an end view of one embodiment of a simplex micro-MT adapter without flanges according to aspects of the present disclosure.

Various embodiments disclosed herein are configured for use as an adaptor, such as a simplex micro-MT adaptor 1400 as shown in FIGS. 14A and 14B. FIG. 14A shows a top view of the simplex micro-MT adaptor 1400, and FIG. 14B shows an end view of the simplex micro-MT adaptor 1400 without a flange. In some embodiments, the simplex micro-MT adaptor 1400 has a length 1402 in a range of about 22 mm to about 28 mm, such as a length of about 27 mm or a length of about 26 mm. In some embodiments, the simplex micro-MT adaptor 1400 has a height 1404 in a range of about 4 mm to about 10 mm, such as a height of about 9 mm or a height of about 8 mm. In some embodiments, the simplex micro-MT adaptor 1400 has a width 1406 in a range of about 7.2 mm to about 13.2 mm, such as a width of about 12.2 mm or a width of about 11.2 mm. In some embodiments, the simplex micro-MT adaptor 1400 has mounting handles 1407 and a height 1408 in a range of about 7 mm to about 13 mm, such as a height of about 12 mm or a height of about 11 mm.

Figures 15A, 15B, 15C:
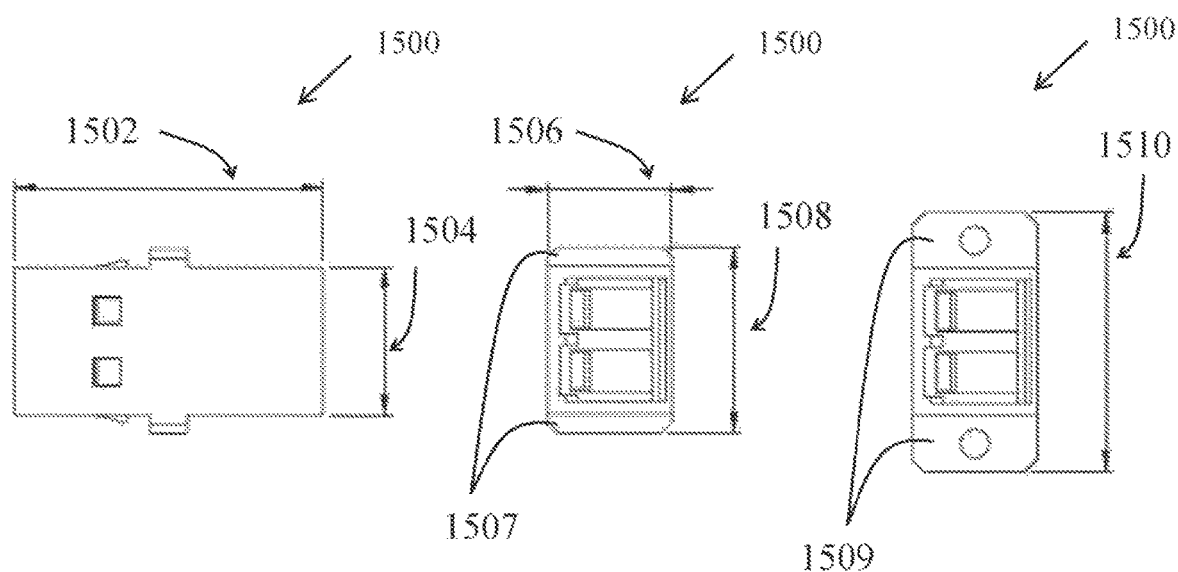
FIG. 15A is a top view of one embodiment of a duplex micro-MT adapter according to aspects of the present disclosure.
FIG. 15B is an end view of one embodiment of a duplex micro-MT adapter without flanges according to aspects of the present disclosure.
FIG. 15C is an end view of one embodiment of a duplex micro-MT adapter with flanges according to aspects of the present disclosure.

Various embodiments disclosed herein are configured for use as an adaptor, such as a duplex micro-MT adaptor 1500 as shown in FIGS. 15A, 15B, and 15C. FIG. 15A shows a top view of the duplex micro-MT adaptor 1500, FIG. 15B shows an end view of the duplex micro-MT adaptor 1500 without a flange, and FIG. 15C shows an end view of the duplex micro-MT adaptor 1500 with a flange. In some embodiments, the duplex micro-MT adaptor 1500 has a length 1502 in a range of about 22 mm to about 28 mm, such as a length of about 27 mm or a length of about 26 mm. In some embodiments, the duplex micro-MT adaptor 1500 has a height 1504 in a range of about 9 mm to about 15 mm, such as a height of about 14 mm or a height of about 13 mm. In some embodiments, the duplex micro-MT adaptor 1500 has a width 1506 in a range of about 7.2 mm to about 13.2 mm, such as a width of about 12.2 mm or a width of about 11.2 mm. In some embodiments, the duplex micro-MT adaptor 1500 has mounting handles 1507 and a height 1508 in a range of about 12 mm to about 18 mm, such as a height of about 17 mm or a height of about 16 mm. In some embodiments, the duplex micro-MT adaptor 1500 has flanges 1509 and a height 1510 in a range of about 18 mm to about 24 mm, such as a height of about 23 mm or a height of about 22 mm.

Figures 16A, 16B, 16C:
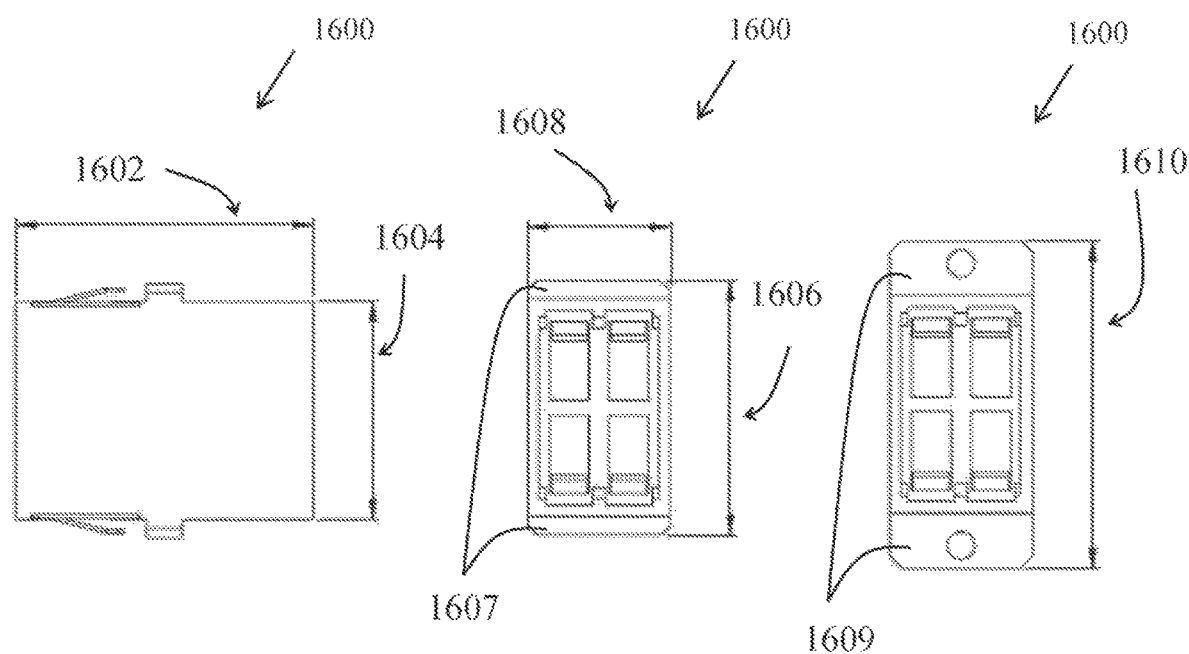
FIG. 16A is a top view of one embodiment of a quad micro-MT adapter according to aspects of the present disclosure.
FIG. 16B is an end view of one embodiment of a quad micro-MT adapter without flanges according to aspects of the present disclosure.
FIG. 16C is an end view of one embodiment of a quad micro-MT adapter with flanges according to aspects of the present disclosure.

Various embodiments disclosed herein are configured for use as an adaptor, such as a quad micro-MT adaptor 1600 as shown in FIGS. 16A, 16B, and 16C. FIG. 16A shows a top view of the quad micro-MT adaptor 1600, FIG. 16B shows an end view of the quad micro-MT adaptor 1600 without a flange, and FIG. 16C shows an end view of the quad micro-MT adaptor 1600 with a flange. In some embodiments, the quad micro-MT adaptor 1600 has a length 1602 in a range of about 22 mm to about 28 mm, such as a length of about 27 mm or a length of about 26 mm. In some embodiments, the quad micro-MT adaptor 1600 has a height 1604 in a range of about 15.3 mm to about 21.3 mm, such as a height of about 20.3 mm or a height of about 19.3 mm. In some embodiments, the quad micro-MT adaptor 1600 has mounting handles 1607 and a width 1608 in a range of about 9 mm to about 15 mm, such as a height of about 14 mm or a height of about 13 mm. In some embodiments, the quad micro-MT adaptor 1600 has a height 1606 in a range of about 18.3 mm to about 24.3 mm, such as a height of about 23.3 mm or a width of about 22.3 mm. In some embodiments, the quad micro-MT adaptor 1600 has flanges 1609 and a height 1610 in a range of about 24.5 mm to about 30.5 mm, such as a height of about 29.5 mm or a height of about 28.5 mm.

FIG. 17A shows an exploded of the simplex micro-MT adaptor 1400, and FIG. 17B shows a perspective view of the simplex micro-MT adaptor 1400. The simplex micro-MT adaptor 1400 comprises a housing 1402 defining a longitudinal passage therethrough, a proximal end 1404 and a distal end 1406, wherein the proximal end 1404 is spaced from the distal end 1406. The housing 1402 comprises at least one mounting tab 1408, a first wall 1410, a second wall 1412, a third wall (not shown), and a fourth wall (not shown), wherein the first wall and the third wall are opposite to each other, the second wall and the fourth wall are opposite to each other, and the second wall 1412 comprises at least one adaptor housing hole 1414. The adaptor 1400 includes at least one latch arm 1416 defined by a proximal end 1418 and a distal end 1420, wherein the proximal end is spaced from the distal end. The proximal end 1418 and the distal end 1420 may each comprise a hook to couple with the adaptor 1400, and the top side of the latch arm 1416 comprises a hook 1422 to couple with the adaptor housing hole 1414.

FIG. 18A shows an exploded view of the duplex micro-MT adaptor 1500, and FIG. 18B shows a perspective view of the duplex micro-MT adaptor 1500. The duplex micro-MT adaptor 1500 comprises a housing 1502 defining a longitudinal passage therethrough, a proximal end 1504 and a distal end 1506, wherein the proximal end 1504 is spaced from the distal end 1506. The housing 1502 comprise at least one mounting tab 1508, a first wall 1510, a second wall 1512, a third wall (not shown), and a fourth wall (not shown), wherein the first wall and the third wall are opposite to each other, the second and fourth walls are opposite to each other, and the second wall 1512 comprises two adaptor housing holes 1514. The duplex micro-MT adaptor 1500 includes at least one latch arm 1516 defined by a proximal end 1518 and a distal end 1520, wherein the proximal end is spaced from the distal end. The proximal end 1518 and the distal end 1520 may each comprise a hook to couple with the adaptor 1500, and a top side of each latch arm 1516 comprises a hook 1522 to couple with an adaptor housing hole 1514.

Figures 19A, 19B:
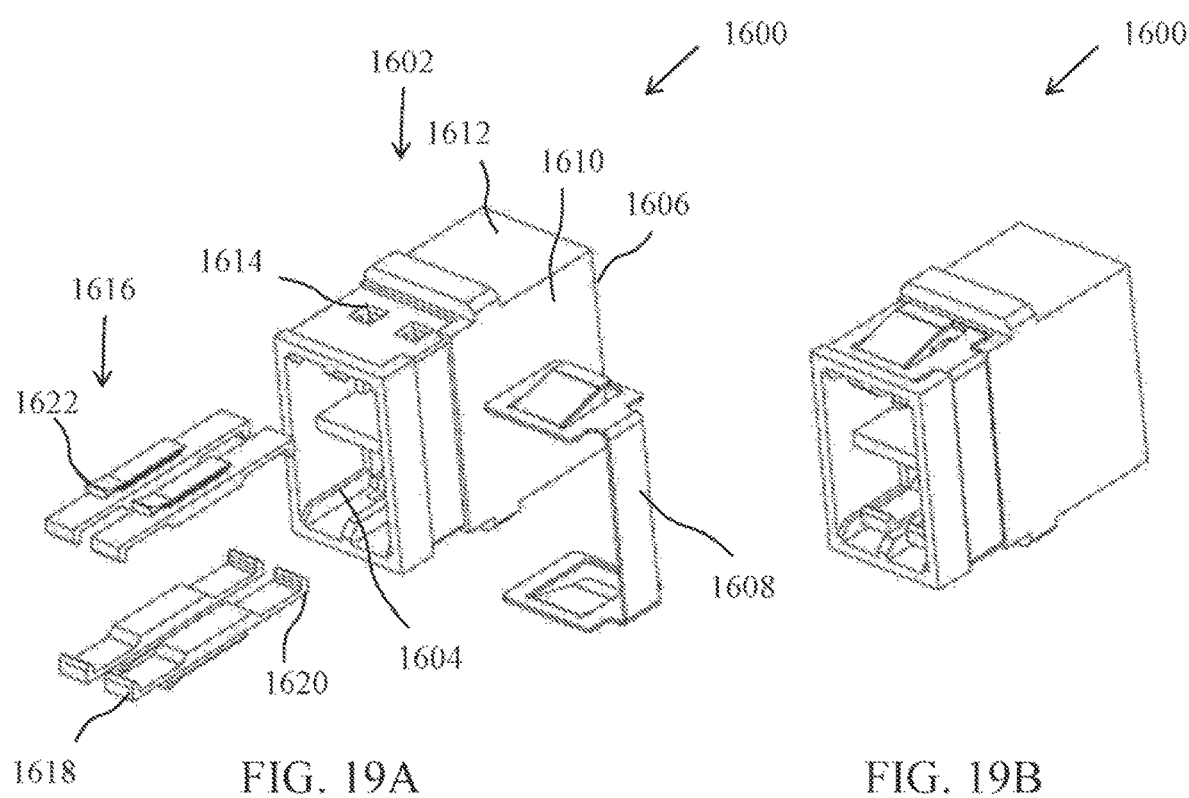
FIG. 19A is an exploded view of one embodiment of a quad micro-MT according to aspects of the present disclosure.
FIG. 19B is a perspective view of one embodiment of a quad micro-MT adapter according to aspects of the present disclosure.

FIG. 19A shows an exploded view of the quad micro-MT adaptor 1600, and FIG. 19B shows a perspective view of the quad micro-MT adaptor 1600. The quad micro-MT adaptor 1600 comprises a housing 1602 defining a longitudinal passage therethrough, a proximal end 1604 and a distal end 1606, wherein the proximal end 1604 is spaced from the distal end 1606. The housing 1602 comprises at least one mounting tab 1608 that attaches to the housing, a first wall 1610, a second wall 1612, a third wall (not shown), and a fourth wall (not shown), wherein the first wall and the third wall are opposite to each other, the second and fourth walls are opposite to each other, the second wall 1612 comprises two adaptor housing holes 1614, and the third wall (not shown) comprises two holes. The quad micro-MT adaptor 1600 includes four latch arms 1616 defined by a proximal end 1618 and a distal end 1620, wherein the proximal end is spaced from the distal end. The proximal end 1618 and the distal end 1620 may each comprise a hook to couple with the adaptor 1600, and each latch arm 1616 comprises a hook 1622 to couple with an adaptor housing hole 1614.

Figure 20A:
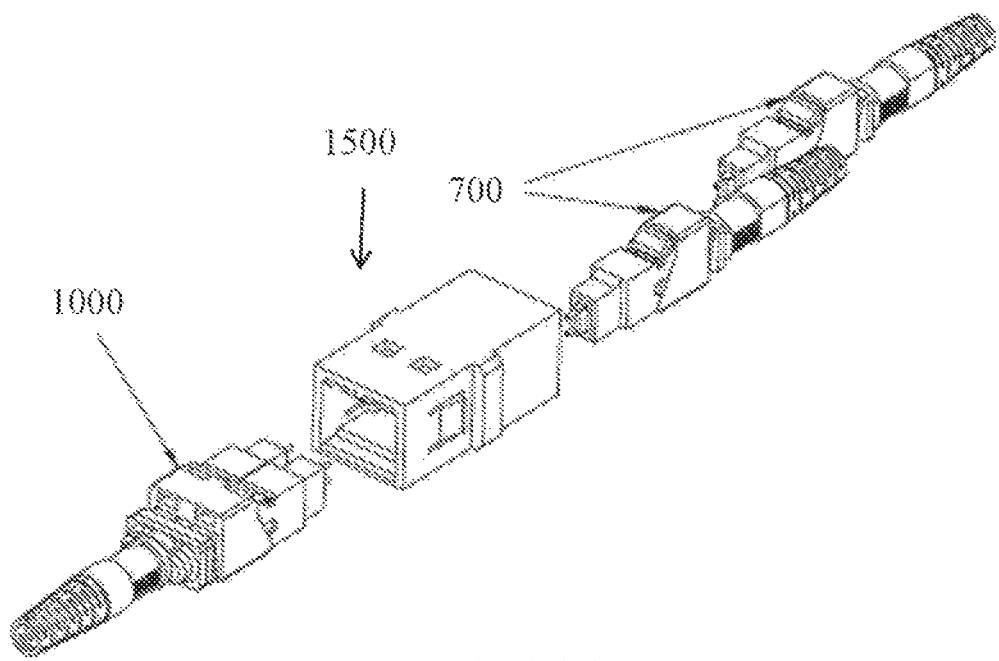
FIG. 20A is an exploded view of one embodiment of a duplex micro-MT connector coupled to a first simplex micro-MT connector and a second simplex micro-MT connector through a duplex micro-MT adapter according to aspects of the present disclosure.
Figure 20B:
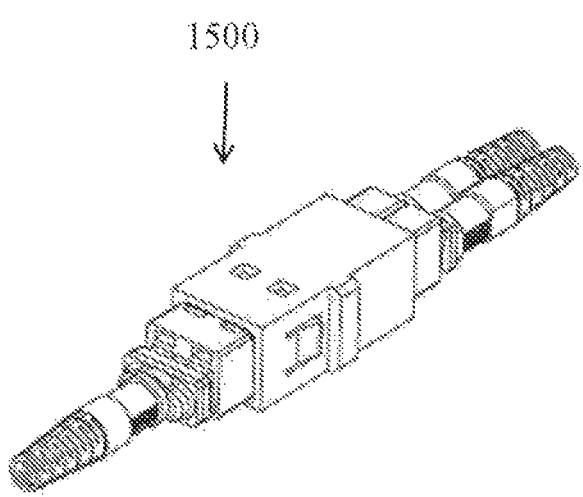
FIG. 20B is a perspective view of the duplex micro-MT connector coupled to a first simplex micro-MT connector and a second simplex micro-MT connector through the duplex micro-MT adapter of FIG. 20A.

FIG. 20A shows an exploded view of a duplex micro-MT adaptor 1500 coupled with a duplex micro-MT connector 1000, a first simplex micro-MT connector 700, and a second simplex micro-MT connector 700. FIG. 20B shows a perspective view of the duplex micro-MT adaptor 1500 coupled with a duplex micro-MT connector 1000, a first simplex micro-MT connector 700, and a second simplex micro-MT connector 700.

Figure 21A:
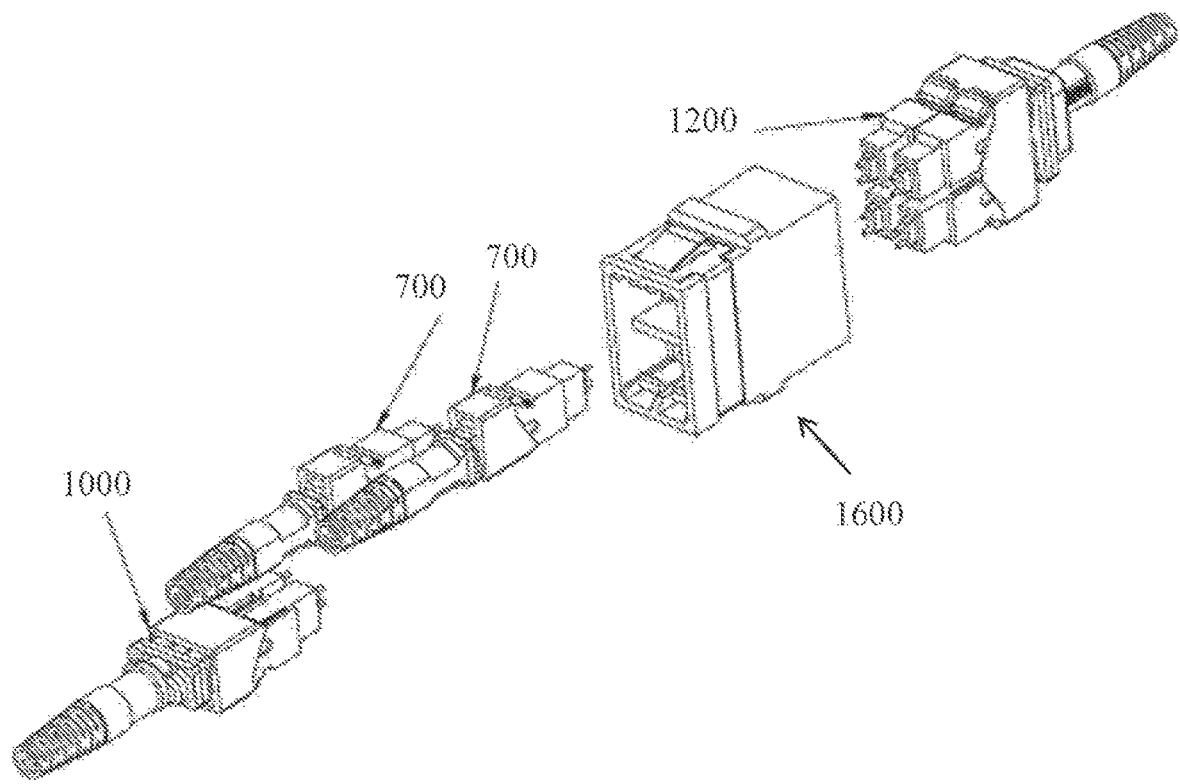
FIG. 21A is an exploded view of one embodiment of a duplex micro-MT connector, a first simplex micro-MT connector, and a second simplex micro-MT connector coupled to a quad micro-MT connector through a quad micro-MT adapter according to aspects of the present disclosure.
Figure 21B:
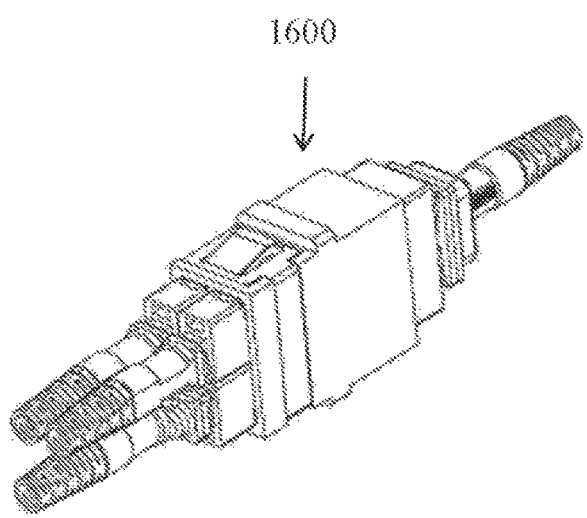
FIG. 21B a perspective view of the duplex micro-MT connector, the first simplex micro-MT connector, and the second simplex micro-MT connector coupled to a quad micro-MT connector through the quad micro-MT adapter of FIG. 21A.

FIG. 21A shows an exploded view of a quad micro-MT adaptor 1600 coupled with a first simplex micro-MT connector 700, a second simplex micro-MT connector 700, a duplex micro-MT connector 1000, and a quad micro-MT 1200 connector. FIG. 21B shows a perspective view of the quad micro-MT adaptor 1600 coupled with a first simplex micro-MT connector 700, a second simplex micro—MT connector 700, a duplex micro-MT connector 1000, and a quad micro-MT 1200 connector.

What is claimed is:

1. A breakout method in a high density network panel application, the breakout method comprising:
plugging an optical fiber connector terminating a single optical fiber cable into a first end portion of an optical fiber adapter such that a respective group of optical fibers of the optical fiber connector are received in each of four channels of the optical fiber adapter;
plugging a plurality of individual optical fiber connectors into a second end portion of the optical fiber adapter such that one of the individual optical fiber connectors is received in each of the four channels of the optical fiber adapter, each of the plurality of individual optical fiber connectors terminating an individual optical fiber cable;
wherein said plugging the optical fiber connector and said plugging the individual optical fiber connectors makes optical connections between the individual optical fiber connectors and the groups of optical fibers in each of the four channels and thereby breaks out the single optical fiber cable into the plurality of individual cables;
wherein said plugging a plurality of individual optical fiber connectors into a second end portion of the optical fiber adapter latches the plurality of individual optical fiber connectors with the optical fiber adapter and such that each of the plurality of individual optical fiber connectors is configured to be individually unlatched from the optical fiber adapter for individual removal by pulling an externally accessible latch release backward away from the optical fiber adapter to displace the latch release in relation to a remainder of the respective individual optical fiber connector such that the individual optical fiber connector can be individually removed without removing any other individual optical fiber connector.

2. The breakout method of claim 1, wherein the optical fiber adapter comprises an adapter housing having first and second cross-sectional outer dimensions, the first and second cross-sectional outer dimensions being perpendicular, the first cross-sectional outer dimension being greater than the second cross-sectional outer dimension, the first cross-sectional outer dimension being in a range of from about 18.3 mm to about 24.3 mm.

3. The breakout method of claim 2, wherein the second cross-sectional outer dimension is in a range of from about 9 mm to about 15 mm.

4. The breakout method of claim 1, wherein the optical fiber connector comprises four MT ferrules and each individual optical fiber connector comprises at least one MT ferrule.

5. The breakout method of claim 1, wherein said plugging the optical fiber connector and said plugging the individual optical fiber connectors makes four Tx-Rx connections between the optical fiber connector and the plurality of individual connectors.

6. The breakout method of claim 1, further comprising pulling an externally accessible latch release of one of the individual optical fiber connectors backward away from the optical fiber adapter to displace the latch release in relation to a remainder of said one of the individual optical fiber connectors to remove said one of the individual optical fiber connectors from the optical fiber adapter without removing any other individual optical fiber connector.

* * * * *